United States Patent [19]

Iitsuka

[11] Patent Number: 5,396,627
[45] Date of Patent: Mar. 7, 1995

[54] METHOD OF PRODUCING OBJECT PROGRAM BASED ON INTERPROCEDURAL DATAFLOW ANALYSIS OF A SOURCE PROGRAM

[75] Inventor: Takayoshi Iitsuka, Koganei, Japan
[73] Assignee: Hitachi, Ltd., Tokyo, Japan
[21] Appl. No.: 938,758
[22] Filed: Sep. 1, 1992

Related U.S. Application Data

[63] Continuation-in-part of Ser. No. 266,479, Nov. 2, 1988, Pat. No. 5,146,594.

[30] Foreign Application Priority Data

Nov. 6, 1987 [JP] Japan .................................. 62-279214

[51] Int. Cl.$^6$ .............................................. G06F 9/45
[52] U.S. Cl. .............................. 395/700; 364/DIG. 1; 364/280; 364/280.4; 364/280.5; 364/232.22
[58] Field of Search ................................ 395/700, 650

[56] References Cited

U.S. PATENT DOCUMENTS

| | | | |
|---|---|---|---|
| 4,710,872 | 12/1987 | Scarborough | 395/700 |
| 4,773,007 | 9/1988 | Kanada | 395/700 |
| 4,821,181 | 4/1989 | Iwasawa et al. | 395/500 |
| 4,833,606 | 5/1989 | Iwasawa et al. | 395/700 |
| 4,847,755 | 7/1989 | Morrison et al. | 395/650 |
| 5,146,594 | 9/1992 | Iitsuka | 395/700 |

OTHER PUBLICATIONS

Triolet, Remi et al. "Direct Parallelization of Call Statements," Proceedings of the SIGPLAN 86 Symposium on Compiler Construction, SIGPLAN Notices vol. 21, No. 7, Jul. 1986, pp. 176–185.

Brode, Brian. "Precompilation of Fortran Programs to Facilitate Array Processing," IEEE Computer, 1981, pp. 46–51.

*Primary Examiner*—Paul V. Kulik
*Attorney, Agent, or Firm*—Fay, Sharpe, Beall, Fagan, Minnich & McKee

[57] ABSTRACT

A method of producing an object program from an inputted source program with a compiler using a computer, includes the steps of: performing an interprocedural dataflow analysis of a variable associated with a procedure such as a subroutine, function, and initialization subprogram; analyzing and summarizing a procedure call effect into a variable region having a possibility of modifying the value of a variable upon a procedure call, a variable region having a possibility of using the value of a variable, and a variable region having a necessity of defining the value of a variable, in accordance with the interprocedural dataflow analysis; and representing data reference at the procedure call by using the summary information, in the dataflow analysis of a procedure part including the procedure call, performing an interprocedural dataflow analysis while discriminating between a case where there is a possibility of data reference and a case where there is a necessity of data reference, and performing an optimization process in accordance with the result of the last-mentioned interprocedural dataflow analysis.

1 Claim, 28 Drawing Sheets

FIG. 2

```
ISN
 1        SUBROUTINE  WWQ (W,Q,A)
 2        COMMON /B1/ R, X(3), TMP(3), SQ, SA
 3        REAL W(3), Q(3,100), A(3,100)
 4        R=R+1.0
 5        DO 10 I = 1,100
 6           CALL OPROD(W,Q(I,I),TMP,R)
 7           SQ=SQ+TMP(1)**2+TMP(2)**2+TMP(3)**2
 8           CALL OPROD(W,A(I,I),TMP,R)
 9           SA=SA+TMP(1)**2+TMP(2)**2+TMP(3)**2
10    10  CONTINUE
11        END

1        SUBROUTINE OPROD (V1,V2,V3,T)
 2        COMMON /B1/ R, X(3),TMP(3), SQ, SA
 3        REAL V1(3), V2(3), V3(3), T
 4        V3(1)=(V1(2)*V2(3)-V1(3)*V2(2))*X(1)*T
 5        V3(2)=(V1(3)*V2(1)-V1(1)*V2(3))*X(2)*T
 6        V3(3)=(V1(1)*V2(2)-V1(2)*V2(1))*X(3)*T
 7        V3(1)=V3(1)+V3(2)+V3(3)
 8        END
```

10 SOURCE PROGRAM

FIG. 3

```
                                              20  CALL COUNT
                                                  REDUCED
ISN                                               SOURCE PROGRAM

1        SUBROUTINE WWQ(W,Q,A)
 2        COMMON /B1/R,X(3),TMP(3),SQ,SA
 3        REAL W(3),Q(3,100),A(3,100),TMP#1(3,100)
 4        R=R+1.0
 5        CALL OPROD#1(W,Q(1,1) TMP#1(1,1),R)
 6        DO 10 I=1,100
 7     10 SQ=SQ+TMP#1(1,I)**2+TMP#1(2,I)**2+TMP#1(3,I)**2
 8        CALL OPROD#1(W,A(1,1),TMP#1(1,1),R)
 9        DO 20 I=1,100
10     20 SA=SA+TMP#1(1,I)**2+TMP#1(2,I)**2+TMP#1(3,I)**2
11        DO 30 J=1,3
12     30 TMP(J)=TMP(J,100)
13        END

1        SUBROUTINE OPROD#1(V1,V2,V3,T)
 2        COMMON /B1/R,X(3),TMP(3),SQ,SA
 3        REAL V1(3),V2(3,*),V3(3,*),T
 4        DO 10 I=1,100
 5          V3(1,I)=(V1(2)*V2(3,I)-V1(3)*V2(2,I))*X(1)*T
 6          V3(2,I)=(V1(3)*V2(1,I)-V1(1)*V2(3,I))*X(2)*T
 7          V3(3,I)=(V1(1)*V2(2,I)-V1(2)*V2(1,I))*X(3)*T
 8          V3(1,I)=V3(1,I)+V3(2,I)+V3(3,I)
 9     10 CONTINUE
10        END

1        SUBROUTINE OPROD(V1,V2,V3,T)
 2        COMMON /B1/R,X(3),TMP(3),SQ,SA
 3        REAL V1(3),V2(3),V3(3),T
 4        V3(1)=(V1(2)*V2(3)-V1(3)*V2(2))*X(1)*T
 5        V3(2)=(V1(3)*V2(1)-V1(1)*V2(3))*X(2)*T
 6        V3(3)=(V1(1)*V2(2) V1(2)*V2(1))*X(3)*T
 7        V3(1)=V3(1)+V3(2)+V3(3)
 8        END
```

FIG. 6

401 REFERENCE REGION INFORMATION ON PROCEDURE OPROD

600 REFERENCED REGION INFORMATION

| DUMMY ARGUMENT POSITION OR GLOBAL VARIABLE ADDRESS 410 | NAME 420 | TYPE 430 | DIMENSION DECLARATION 440 | MODIFIED REGION 450 | USED REGION 460 | DEFINED REGION 470 |
|---|---|---|---|---|---|---|
| 1 | V1 | REAL | (1:3) | φ | (1:3:1) | φ |
| 2 | V2 | REAL | (1:3) | φ | (1:3:1) | φ |
| 3 | V3 | REAL | (1:3) | (1:3:1) | φ | (1:3:1) |
| 4 | T | REAL | (1:1) | φ | (1:1:0) | φ |
| (B1,4) | X | REAL | (1:3) | φ | (1:3:1) | φ |

```
ISN
 5       DO  10 I = 1 , 100
 6         CALL OPROD(W,Q(I,I) TMP,R)
 7         SQ=SQ+TMP(1)**2+TMP(2)**2+TMP(3)**2
 8         CALL OPROD(W,A(I,I),TMP,R)
 9         SA=SA+TMP(1)**2+TMP(2)**2+TMP(3)**2
10       10 CONTINUE
```

910 SOURCE PROGRAM

920 DEPENDENCE GRAPH

931 STRONGLY CONNECTED COMPONENT

932 STRONGLY CONNECTED COMPONENT

↓ FLOW DEPENDENCE BY CONVENTIONAL ANALYSIS
↓ FLOW DEPENDENCE
ⓝ STATEMENT OF ISN n
▢ STRONGLY CONNECTED COMPONENT

FIG. 11

15 CALL COUNT INFORMATION

| CALLER PROCEDURE NAME (152) | CALL SITE ISN (154) | CALLEE PROCEDURE NAME (156) | CALL COUNT (158) |
|---|---|---|---|
| WWQ | 6 | OPROD | 100 |
| WWQ | 8 | OPROD | 100 |

FIG. 12

1200 SELECTION TABLE

| CALLEE PROCEDURE NAME (1210) | CALL SITE GROUP NUMBER (1220) | TOTAL CALL COUNT OF GROUP (1230) |
|---|---|---|
| OPROD | 1 | 200 |

FIG. 13

700 PROCEDURE NAME INFORMATION

| PROCEDURE NAME (710) | POINTER TO CALL SITE INFORMATION (720) | REDUCTION ATTRIBUTE (730) |
|---|---|---|
| WWQ | POINTER TO CALL SITE INFORMATION (OMITTED) OF WWQ | CALLER |
| OPROD | POINTER TO CALL SITE INFORMATION (510) OF OPROD | CALLEE |

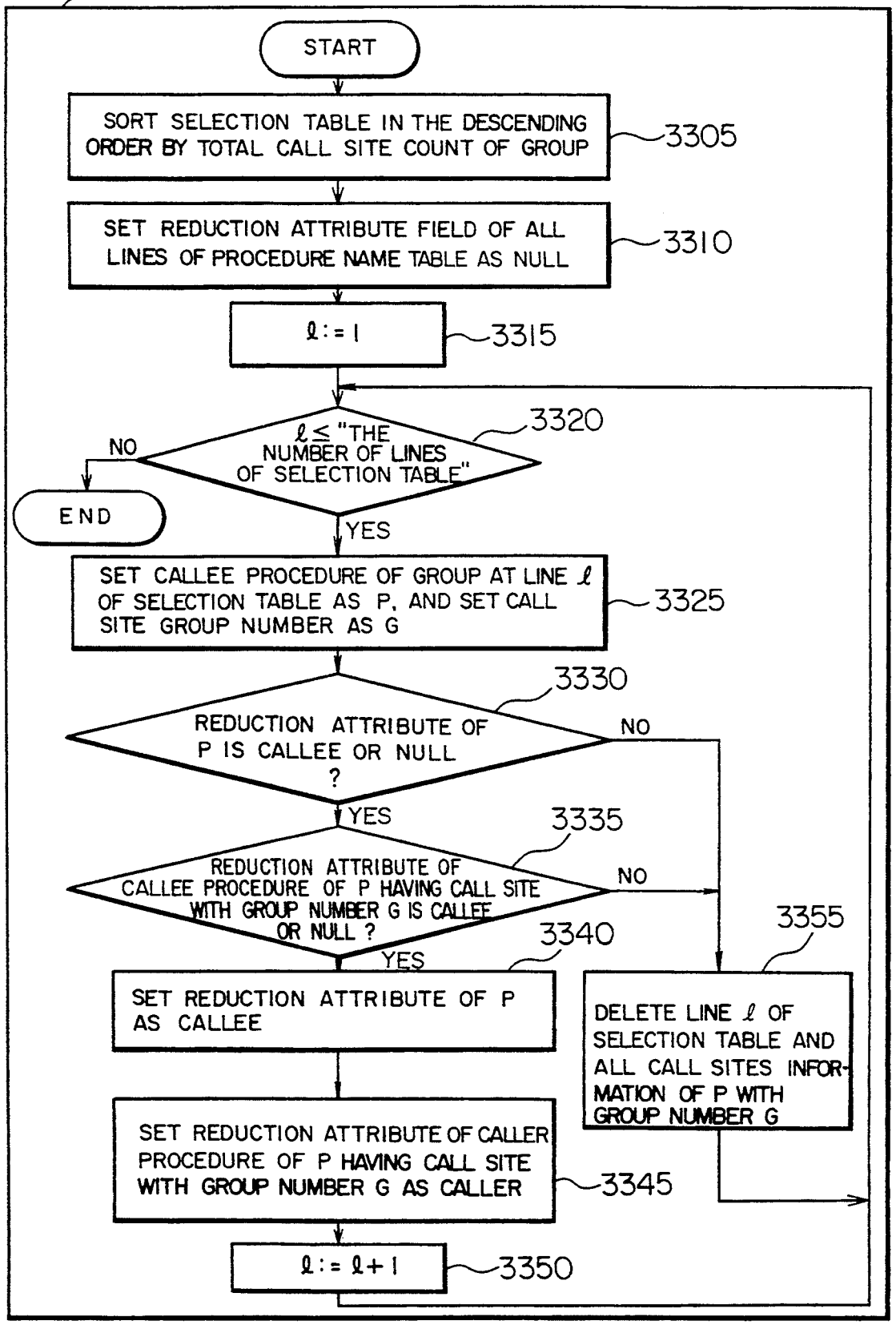

FIG. 16

```
SUBROUTINE WWQ (W,Q,A)
COMMON /B1/R, X(3), TMP(3), SQ, SA                      ~1610
REAL W(3), Q(3,100), A(3,100), TMP#1(3,100)
R = R + 1.0
```

```
   DO 11 I = 1,100                    ~1611
11  CALL OPROD (W,Q(1,I) TMP#1(1,I),R)   ~1613
   DO 10 I = 1,100                    ~1612
10  SQ = SQ + TMP#1(1,I)**2 + TMP#1(2,I)**2 + TMP#1(3,I)**2
   DO 12 I = 1,100                    ~1615
12  CALL OPROD (W,A(1,I), TMP#1(1,I),R)   ~1617
   DO 20 I = 1,100                    ~1616
20  SA = SA + TMP#1(1,I)**2 + TMP#1(2,I)**2 + TMP#1(3,I)**2
```
~1630
~1614
~1640
~1618

```
   DO 30 J = 1,3                     ~1619
30  TMP(J) = TMP#1(J,100)
   END
```
~1620

1610
~ 1619  NEWLY INTRODUCED ARRAYS

1620   COPY NEW ARRAYS TO ORIGINAL
       ARRAYS

1630   DO LOOP WITH CALL SITE WHICH
~      CAUSED LOOP SPLIT
1640

FIG. 18

```
ISN
 1      SUBROUTINE WWQ(W,Q,A)
 2      COMMON /B1/R,X(3),TMP(3),SQ,SA
 3      REAL W(3),Q(3,100),A(3,100),TMP#1(3,100)
 4      R=R+1.0
 5      CALL OPROD#1(W,Q(1,1),TMP#1(1,1),R)
 6      SQ=SQ+VSUM(TMP#1(1,*),TMP#1(2,*)**2+TMP#1(3,*)**2)
 7      CALL OPROD#1(W,A(1,1),TMP#1(1,1),R)
 8      SA=SA+VSUM(TMP#1(1,*),TMP#1(2,*)**2+TMP#1(3,*)**2)
 9      DO 20 J=1,3
10  20  TMP(J)=TMP#1(J,100)
11      END

1      SUBROUTINE OPROD#1(V1,V2,V3,T)
 2      COMMON /B1/R,X(3),TMP(3),SQ,SA
 3      REAL V1(3),V2(3,*),V3(3,*),T
 4      V3(1,*)=(V1(2)*V2(3,*)-V1(3)*V2(2,*))*X(1)*T
 5      V3(2,*)=(V1(3)*V2(1,*)-V1(1)*V2(3,*))*X(2)*T
 6      V3(3,*)=(V1(1)*V2(2,*)-V1(2)*V2(1,*))*X(3)*T
 7      V3(2,*)=V2(1,*)+V2(2,*)+V3(3,*)
 8      END
```

FIG. 19

| ISN | |
|---|---|
| 1 | SUBROUTINE OPROD#1 (V1,V2,V3,T) |
| 2 | PARAMETER (NP=8) |
| 3 | COMMON /B1/R, X(3), TMP(3), SQ, SA |
| 4 | REAL V1(3), V2(3,*), V3(3,*), T |
| 5 | PLOCAL I |
| 6 | DO ALL IP=0, NP-1 |
| 7 | DO 10 I = 1+IP, 100, NP |
| 8 | V3(1,I) = (V1(2)*V2(3,I)-V1(3)*V2(2,I))*X(1)*T |
| 9 | V3(2,I) = (V1(3)*V2(1,I)-V1(1)*V2(3,I))*X(2)*T |
| 10 | V3(3,I) = (V1(1)*V2(2,I)-V1(2)*V2(1,I))*X(3)*T |
| 11 | V3(1,I) = V3(1,I)+V3(2,I)+V3(3,I) |
| 12  10 | CONTINUE |
| 13 | END DO ALL |
| 14 | END |

FIG. 20

```
SUBROUTINE SUB1(A)
REAL A(100,100),V(100,100)
DO 10 J=1,100
    CALL SUB2(A(1,J),V(1,J))
    S=0
    DO 20 I=1,100
        S=S+V(I,J)
20  CONTINUE
    A(J,J)=S
10  CONTINUE
END
```

↑ EXTENSION OF V'S DIMENSION

EXECUTABLE IN PARALLEL FOR EACH VALUE OF J

ISN
1      SUBROUTINE SUB1(A)
2      REAL A(100,100),V(100)
3      DO 10 J=1,100
4      CALL SUB2(A(1,J),V)
5      S=0
6      DO 20 I=1,100
7      S=S+V(I)
8  20 CONTINUE
9      A(J,J)=S
10 10 CONTINUE
11     END

1      SUBROUTINE, SUB2(V1,V2)
2      REAL V1(100),V2(100)
3      DO 30 I=1,100
4      IF(V1(I),GT,0.0)THEN
5      V2(I)=V1(I)
6      ELSE
7      V2(I)=-V1(I)
8      END IF
9  30 CONTINUE
10     END

1~4 DEPENDENCE GRAPH

REFERENCED REGION INFORMATION AT CALL SITE 2000

| NAME | TYPE | DIMENSION DECLARATION | MODIFIED REGION | USED REGION | DEFINED REGION |
|---|---|---|---|---|---|
| W | REAL | (1:3) | φ | (1:3:1) | φ |
| Q | REAL | (1:3, 1:100) | φ | (1:3:1, 1) | φ |
| TMP | REAL | (1:3) | (1:3:1) | φ | (1:3:1) |
| R | REAL | (1:1) | φ | (1:1:0) | φ |
| X | REAL | (1:3) | φ | (1:3:1) | φ |

METHOD OF PRODUCING OBJECT PROGRAM BASED ON INTERPROCEDURAL DATAFLOW ANALYSIS OF A SOURCE PROGRAM

CROSS-REFERENCE TO RELATED APPLICATION

This is a continuation-in-part of the patent application Ser. No. 07/266,479, filed on Nov. 2, 1988, now U.S. Pat. No. 5,146,594.

BACKGROUND OF THE INVENTION

The present invention relates to a compiler which analyzes source programs and produces object programs using a computer, and more particularly to a method of producing object programs suitable for optimization of a source program which contains calling of procedures (procedure call).

A function of a compiler to produce an object program so as to allow it high speed operation is called optimization. Conventionally, optimization has been allowed to be applied only within one procedure such as a subroutine, function and the like. However, recently, interprocedural optimization has been used, as discussed in "Direct Parallelization of CALL statements", Proceedings of the SIGPLAN 86 Symposium on Compiler Construction, SIGPLAN Notices Vol. 21, No. 7, July, 1986, pp. 176 to 185. In this paper, a method of analyzing array references interprocedurally is discussed which is necessary to judge if a loop containing a procedure call can be executed in parallel. According to this method, the procedure call effect is summarized into the information named region which indicates the part of an array referenced in a procedure. In fact this method can analyze two kind of regions. One is the region as a part of an array whose values may be modified upon a procedure call. And the other is the region as a part of an array whose values may be used upon a procedure call. In parallelization of a loop containing a procedure call, if there is no overlap among regions which may be referenced at each iteration of the loop, then it is judged that the loop can be executed in parallel. More precisely, it is analized if there is overlap between a certain region which may be modified values at a certain iteration of the loop, and another region which may be modified or used values at another iteration of the loop. If there is no overlap, then it is judged that each iteration of the loop can be executed in parallel at the same time.

The above-described prior art, however, is directed to a problem of lowering the capability of optimization when the same region is referred to plural times. For instance, consider the program shown at the left side in FIG. 20 wherein V is referred to at 4-th and 7-th lines of ISN in subroutine SUB1. Since all elements of array V are redefined each time subroutine SUB2 is called at 4-th line of ISN in the subroutine SUB1, the values of the elements of array V are used independently on each value of control variable J of DO 10. Therefore, by extending the dimension of V as shown at the right side in FIG. 20, DO 10 can be executed in parallel for respective values of J. With this parallelization of the loop, the execution speed of the program module becomes as fast as 100 times, at a maximum, that of a conventional one wherein the loop is repeated 100 times from J=1 to J=100. However, with the prior art method, only the possibility of modifying or using values of array V at each iteration of the DO 10 loop at SUB1 is analyzed, and it is not known that a definition is always performed prior to the use of array V. Thus, it is impossible to effect such optimization.

As other prior art, U.S. patent application Ser. No. 15,018 now U.S. Pat. No. 4,773,007, (filed on Feb. 17, 1987) "A compiler code optimization method for a source program having a first and second array definition and use statement in a loop" is associated with the present invention. The prior art shown in the U.S. patent is a dataflow analysis technology as to elements of array, and the scope of analysis is limited to be within a loop of one procedure, but by taking into consideration the control flow in a procedure, a data flow among reference points of array elements can be analyzed precisely. That is, in the prior art, by investigating reference of array elements successively along execution order of the program within a loop, it is possible to carry out analysis distinguishing possibility and necessity such that a value of array element defined in a statement reaches another statement without being defined on the way, or that only that value reaches the other element. But, in the prior art, the subject of the analysis is only elements of array, and the scope of analysis is limited to be only within a procedure. This prior art cannot be applied therefore to the program shown in FIG. 20. If this prior art is combined with the first described prior art "direct parallelization of CALL statements", then a loop containing a procedure call can be processed. However, the prior art methods are effective only for the case wherein each array reference within a loop is made to a single array element, and so these methods cannot be applied to the program shown in FIG. 20. In the program shown in FIG. 20, not an array element but a region V (1:100) is defined and used in the loop DO 10, so that the above-described prior art methods are not effective for parallelizing this program.

SUMMARY OF THE INVENTION

It is an object of the present invention to provide a method of producing an object program, which method is capable of proper optimization even when the same region is referred to plural times by providing a new function to analyze a program containing a procedure call.

According to the present invention, the above object is achieved by using the procedure call effect summary information which discriminates between a possibility of and a necessity of reference to regions.

There are two types of "reference" one being for definition or value modification and the other for value use. The necessity of a use has no influence upon a dataflow. The dataflow is accordingly analyzed as follows according to the present invention.

In the interprocedural dataflow analysis, incorporated as the procedure call effect summary information are regions having a possibility of modifying (defining) values upon a procedure call, regions having a possibility of using values prior to any definition of that region, and regions having a necessity of defining values. In the intraprocedural dataflow analysis for a program containing a procedure call, the data reference in the procedure call is represented by the summary information, and the dataflow analysis is performed to discriminate between a reference possibility and a reference necessity.

By identifying the region having a possibility of modifying values upon a procedure call and the region having a possibility of using values prior to any definition of that region, it is possible to know precisely where the values including the region are set or used in the program, between statements including a procedure call. Since the information on use is the information on use prior to any difinition, it is possible to exclude the use of values once redefined in the procedure. And, only the region use values at the entry of callee procedure is found, in case where the same region is referred to upon a plurality of procedure calls, it is possible to distinguish that each reference does not use the values at the entry of callee procedure but uses the values defined in callee procedure, and that each reference utilizes the region independently. Therefore, in this case, by changing the sub-array region for each procedure call into a different array, the plurality of procedure calls can be optimized, e.g., executed in parallel. In the case of a loop, parallelization become possible by extending the dimensions of arrays.

Also, by identifying the region having a necessity of defining values upon a procedure call, it is possible to judge if the values set before the procedure call can be still used after the procedure call. Therefore, it is possible to more clearly judge, than conventional, the possibility of parallelization between statements before and after the procedure call, i.e., to judge if the statements can be processed in parallel, to thus extend the application of optimization. The operation of the above function will be described with reference to FIG. 21. The dependence graph according to a conventional analysis is indicated by reference to numeral 1, and the dependence graph according to the present invention is indicated by reference numeral 2. S1 to S3 are statements including one or more procedure calls, and arrows interconnecting them indicate dependence between statements. According to the present invention, the region which is necessarily defined by S2 is discriminated by the interprocedural dataflow analysis so that it is possible to know that there is no flow dependence of S1 upon S3. In the dependence graph 2, it is assumed that there is no flow dependence of S1 upon S3. The conventional technique does not analyze if the variable region is necessarily defined upon a procedure call. Therefore, it is impossible to know that there is no flow dependence of S1 upon S3. After deletion of anti-dependence from S1 to S2 through renaming of array rename or the like, the dependence graph 1 becomes a graph 3, and the dependence graph 2 a graph 4. In the dependence graph 3, only that S1 and S2 can be executed in parallel is known. However, in the dependence graph 4, since there is no flow dependence of S1 upon S3, S1 and S3 can be executed in parallel. As a result, if the execution time of S2 is much shorter than that of S1 or S3, the execution time by the graph 4 becomes about half that by the graph 3, to thus considerably reduce the execution time.

According to the present invention, in a program including a procedure call, a dataflow dependence can be analyzed precisely even for the case where an array used by the procedure call is used by another procedure call or statement, to thus promote optimization of the program portion including the procedure call.

According to the present invention, the processing of calling the procedure at each of loop iteration as in the conventional can be changed to the processing of only one calling the procedure that includes the loop iteration of caller site DO loop, because it can be discriminated that the region is necessarily defined upon a procedure call. Therefore, it becomes possible to reduce the number of call counts.

As to the call count reduction, the execution count of procedure calls becomes "1/loop repetition number" in case that a procedure call is included in a loop. Thus, the execution time of a program including a procedure call can be remarkably reduced. In addition, since a DO loop is added to a procedure which does not include a DO loop at first, the number of subjects undergoing vectorization and parallelization increases, to thus provide high speed processing of programs with supercomputers/multiprocessors.

BRIEF DESCRIPTION OF THE DRAWINGS

These and other objects and advantages of the present invention will become apparent by reference to the following description and accompanying drawings, wherein:

FIG. 2 shows an example of a FORTRAN source program to be inputted to a compiler;

FIG. 3 shows a source program obtained after call count reduction of the program shown in FIG. 2;

FIG. 6 is a referenced region information map;

FIG. 11 is a call count information map;

FIG. 12 is a selection table;

FIG. 13 is a procedure name information map;

FIG. 14 is a flow chart showing the operation of determining call count reduction;

FIG. 16 shows a source program after loop split;

FIG. 18 shows a source program after further vectorization;

FIG. 19 shows a source program after further parallelization;

FIG. 20 shows an example of a program to be used for explaining a prior art problem;

DESCRIPTION OF THE PREFERRED EMBODIMENT

An embodiment of the method of producing an object program according to the present invention will be described with reference to the accompanying drawings. In this embodiment, as an example of optimization using the interprocedural dataflow analysis, a new optimization of CALL count reduction is selected. The invention is not intended to be limited to such optimization only, but the invention is broadly applicable also to most of presently available optimization.

CALL count reduction is an optimization wherein the number (CALL count) of procedure calls to be executed by a program is reduced. For instance, in procedure WWQ in a FORTRAN program shown in FIG. 2, CALLS to procedure OPROD are repeated in 200 times, i.e., 100 times×2 occurrences in DO 10 loop. The program shown in FIG. 2 can be transformed through CALL count reduction into a program shown in FIG. 3 whereby the same procedure as that shown in FIG. 2 can be performed with only two procedure calls. Therefore, the overhead of each CALL can be reduced through CALL count reduction, and the overhead of the procedure can be remarkably reduced due to a considerable CALL count reduction.

As seen from an example of transformation of the program of FIG. 2 into the program of FIG. 3, the CALL count reduction pays attention to a procedure call within a loop. Iterations of the loop are transferred to the callee procedure to reduce the execution count (CALL count) of the procedure. In practice, taking into consideration that the callee procedure may also be called by other procedures, iterations of the loop are transferred to a copy of the callee procedure to leave the callee procedure itself as it is. In order to reduce the number of copies of a callee procedure, if iterations of the loop are the same, the process to share the copy or split the loop for transfer of loop iteration is also employed.

In the loop split to be performed before loop iterations, the loop containing a procedure call is split with respect to the procedure call. New loops not containing the procedure call can further be subjected to vectorization and parallelization.

Figure 1:
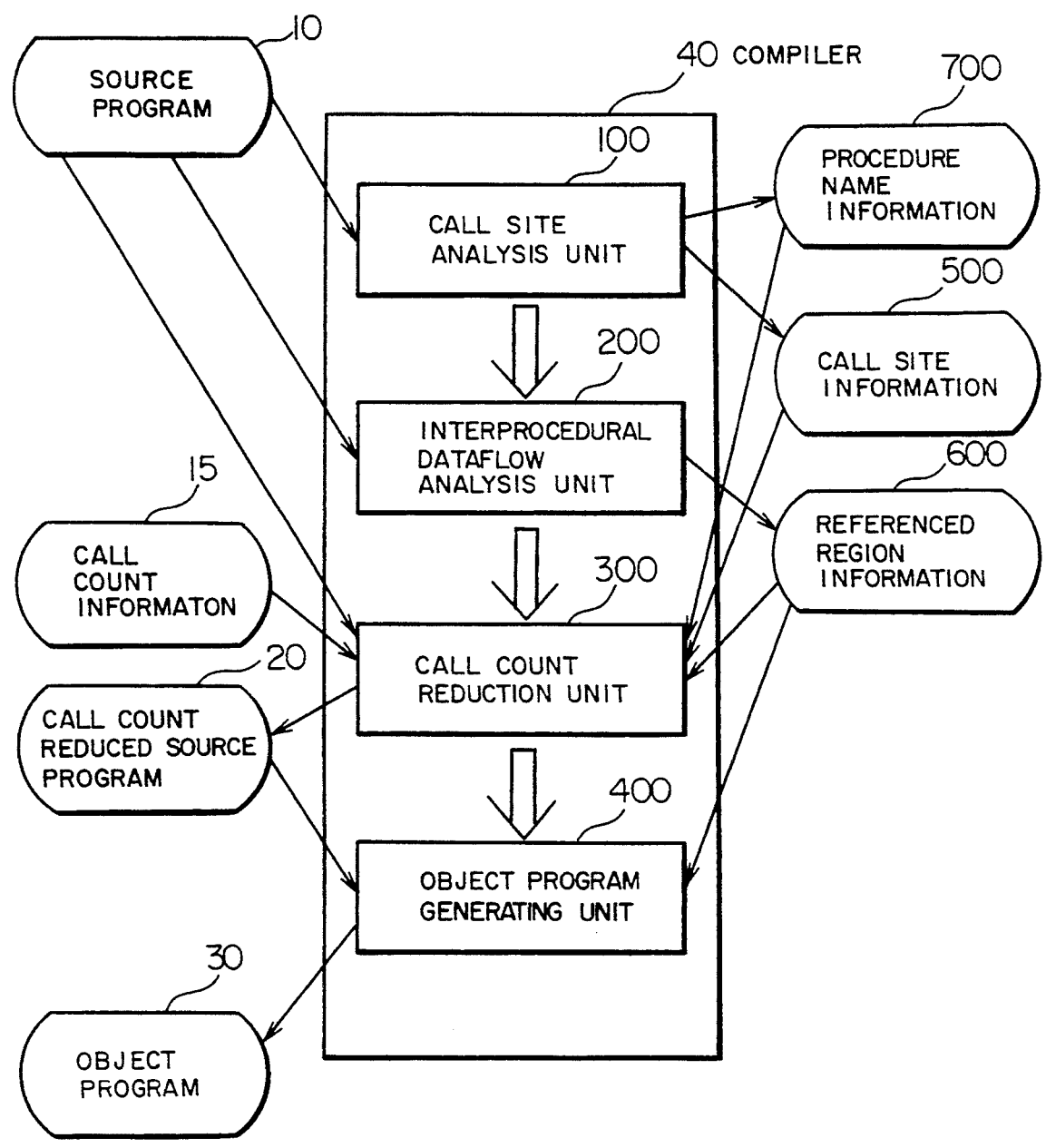
FIG. 1 shows the structure of an embodiment of the method of producing an object program according to the present invention.

FIG. 1 is a functional block diagram of a compiler embodying the present invention by using a computer. A compiler 40 inputs a source program 10 and outputs an object program 30. In this embodiment, in order to determine an optimum CALL reduction site, the compiler 40 further inputs CALL count information 15 indicating the number of CALLs to a particular procedure from other procedures. The CALL count information 15 can be obtained as an output from a known utility program which analyzes the dynamic characteristic of a program. Procedure name information 700, CALL site information 500 and referenced region information 600 constitute internal data to be used for CALL count reduction. A CALL count reduced source program 20 is a program obtained after CALL count reduction of the source program 10.

The compiler 40 is constructed of a CALL site analysis unit 100, interprocedural dataflow analysis unit 200, CALL count reduction unit 300 and object program generating unit 400.

The CALL site analysis unit 100 receives the source program and outputs the procedure name information 700 and CALL site information 500. The procedure name information 700 represents a list of all procedure names contained in the source program 10. The CALL site information 500 represents actual argument information on a procedure call site within the innermost loop of each procedure.

Only the CALL site information 500 of the innermost loop is used. The reason for this is to reduce the memory capacity which would otherwise become large when embodying this invention. However, this limitation may not be applied.

The interprocedural dataflow analysis unit 200 receives the source program 10 and analyzes all procedures contained in the source program 10 to check if there are regions (modified region) having a possibility of modification of values upon a procedure call regions (used region) having a possibility of use of values prior to any definition upon a procedure call, regions (defined region) having a necessity of defining of values upon a procedure call. The interprocedural dataflow analysis unit 200 outputs the referenced region information 600 as the analysis results.

The CALL count reduction unit 300 receives the source program 10, procedure name information 700, CALL site information 500, referenced region information 600 and CALL count information 15, and outputs the CALL count reduced source program 20 obtained after CALL count reduction of the source program 10.

The object program generating unit 400 receives the CALL count reduced source program 20 and outputs the object program 30.

The details of the object program generating unit 400 which is known in the art is omitted. The object program generating unit 400 also performs the already known optimization on the CALL count reduced source program 20. The already known optimization is applicable to this embodiment by using the referenced region information 600, the detailed description therefor being omitted.

The operation of the units 100 to 400 of the compiler 40 will be described hereinafter.

First, the operation of the CALL site analysis unit 100 will be described using FIG. 4.

Figure 5:
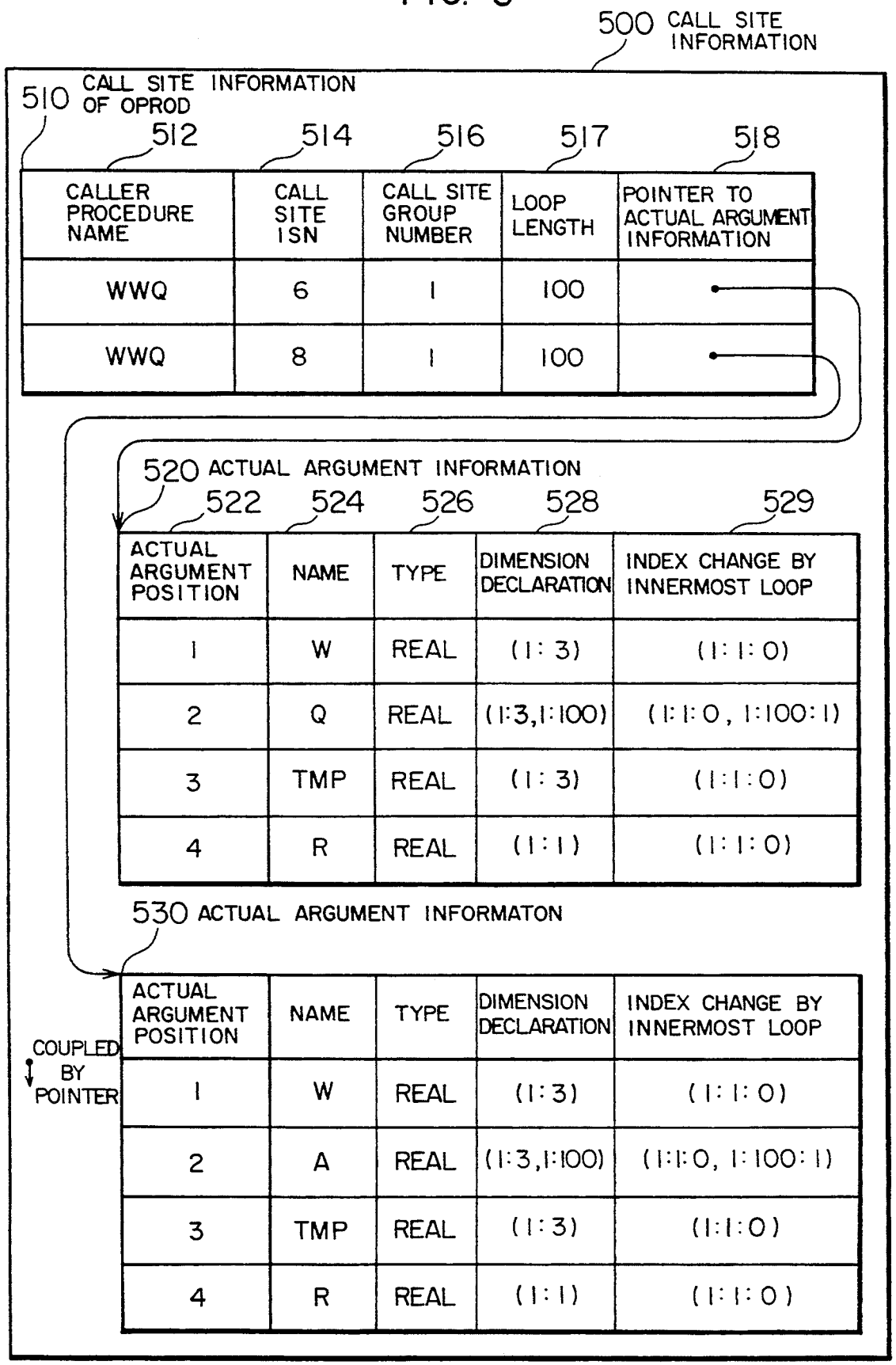
FIG. 5 is a CALL site information map.

At step 105, it is checked if a program module to be read is still left. If YES, the control advances to step 110, whereas if NO, the process completes. At step 110, a single program module is read and advances to step 115 where the procedure name of the program module is stored in the procedure name information 700 table whose format is shown in FIG. 13, and thereafter, the control advances to step 120. Referring to FIG. 13, the information 700 table is constructed of a field 710 for storing procedure names of program modules, a field 720 for storing pointers to the CALL site information 500 associated with the program module call site, and a field 730 for storing the reduction attributes (to be described later) of program modules. The last field 730 is not supplied with any information by the call site analysis unit 100. At step 120, the first statement of the program module is set as S to thereafter advance to step 125 where it is judged if S is a DO statement or not. If YES, the control advances to step 130, whereas if NO, the control advances to step 165. At step 130, it is judged if the DO loop at S is the innermost loop or not. If YES, the control advances to step 135, whereas if NO, the control advances to step 165. At step 135, the first statement of the DO loop is set as T to thereafter advance to step 140 where it is judged if T is a CALL statement or not. If YES, the control advances to step 145, whereas if NO, the control advances to step 155. At step 145 investigating control flow in the loop, it is judged if the CALL statement is necessarily executed in the DO loop or not. If YES, the control advances to step 150, whereas if NO, the control advances to step 155. Thus, on condition that the statement is a CALL statement within an innermost DO loop of a program module which statement is necessarily executed, the control advances to step 150. At step 150, the actual argument information of the CALL statement is added to the CALL site information 500 of a callee procedure, the format of the CALL site information 500 being shown in FIG. 5. Referring to FIG. 5, the CALL site information 500 table is constructed of a table 510 for storing information on the CALL statement (CALL site) of each caller procedure, a field 512 for storing procedure names of each caller, a field 514 for storing ISN of the CALL site, a field 516 for storing a group number (to be described later) of the CALL site, a field 517 for storing a loop length of the innermost loop surrounding the CALL site, and a field 518 for storing a pointer to the real argument information (520, 530) at the CALL site. ISN stands for a number indicating the line position in a procedure. The format of the actual argument information will be described, using the information indicated at 520 by way of example. The real argument information table is constructed of a field 522 for storing a position or order of an actual argument within a dummy argument list, a field 524 for storing a name of an actual argument variable/array, a field 526 for storing the type of an actual argument, a field 528 for storing a dimension declaration of an actual argument, and a field 529 for storing a change in index value of the actual argument by execution of the innermost loop. If the actual argument is a variable, it is considered as an array of dimension 1, length 1. If the actual argument is other than a variable/array (like as expression), it is considered as a variable without name. In a representation (r1, r2, ... , rn) used in the fields 528 and 529, each ri ($1 \leq i \leq n$) indicates the index information of the i'th dimension. A representation (a:b) means that the lower limit of the index is a and the upper limit is b. A representation (a:b:c) means that the initial value of the index is a, the last value is b, and the increment b.

Referring back to FIG. 4, the operation of the CALL site analysis unit 100 will further be given. After the process at step 150, the control advances to step 155 where it is judged if T is the last statement of the DO loop. If YES, the control advances to step 165, whereas if NO, the control advances to step 160. At step 160, the next statement after T is again set as T to thereafter advance to step 140 for processing statements within the DO loop. At step 165, it is judged if S is the last statement within the program module. If YES, the control advances to step 170 for processing the next program module, whereas if NO, the control advances to step 125 to continue processing statements within the program module now concerned. The description of operation of the CALL site analysis unit 100 has been given as above.

For instance, given a FORTRAN program shown in FIG. 2 as the source program 10, the CALL site analysis unit 100 outputs the CALL site information 500 shown in FIG. 5 (only CALL site information of procedure OPROD is indicated) and the procedure name information 700 shown in FIG. 13 (assuming the reduction attribute is not yet set).

Next, the interprocedural dataflow analysis unit 200 will be described using FIG. 22. The unit 200 generates the reference region information 600 for all procedures contained in the source program 10. The format of the referenced region information 600 will first be described with reference to FIG. 6 wherein the referenced region information 401 of procedure OPROD of the FORTRAN program of FIG. 2 is shown. The referenced region information 600 is formed for the sake of dummy arguments and global variables to be referred to by each procedure, and stores, for each variable/array, information regarding a dummy argument location or global variable address 410, name 420, dimension declaration 440, modified region 450, used region 460, and defined region 470. The field 410 adopts a representation (b, d) in the case of a global variable address, where b is a common block name and d is an offset within a common block. The modified, used and defined regions 450, 460 and 470 represent, using the same formats as of the field 529 shown in FIG. 5, the region having a possibility of modification of values of variable/array upon a procedure call, the region having a possibility of use of values prior to any modification of values at the time of a procedure call, and the region having a necessity of define of values, respectively. $\phi$s in the regions 450, 410 and 470 means that corresponding region is empty.

The operation of the interprocedural dataflow analysis unit 200 will be described using the flow chart shown in FIG. 22. At step 210, the procedure name table is sorted in the reverse execution order. In the reverse execution order, the caller procedure at a certain procedure call comes by all means after the callee procedure. In the following processing between steps 220 and 290, it is assumed that the callee procedures (procedures being called from the procedure under processing) have already been processed as same. So, they already have region summary information. The reverse execution order is, for example, first OPROD and then WWQ in the program shown in FIG. 2. A FORTRAN language used in this embodiment is assumed not to include a recursive CALL so that the reverse execution order is always present. Next, at step 220, a procedure at the top of the procedure name table is read. At step 230, intraprocedural optimization inclusive of that of procedure calls is performed using the referenced region information. Step 230 for intraprocedural optimization is known in the art except that for procedure calls. Since optimization for procedure calls can utilize the referenced region information according to the present invention, optimization becomes more extensively applicable to procedure calls than conventional. Procedure CALLs are processed as shown in FIG. 23. First, at step 221, in accordance with an actual argument at a procedure call site and the referenced region information of the callee procedure, the region to be referred to at the CALL site represented by using variables within the caller procedure. Since the sorting process at step 210 shown in FIG. 22 was performed for the callee procedure, the processes at step 230 to 270 have been already completed and the referenced region information 600 for the callee procedure is already available. The referenced region information at CALL site indicated at 2000 in FIG. 24 is the information thus obtained for the procedure call of ISN 6 statement of procedure WWQ of the program shown in FIG. 2. The difference of the information 2000 from the referenced region information 600 of the callee procedure is that the former information 2000 is represented by using variables of the caller procedure (WWQ). The fields 2020 to 2070 correspond to the fields 420 to 470 shown in FIG. 6. In case where a procedure call is contained in a loop and hence executed plural times, the region to be referenced to by the procedure call changes at each iteration of the loop. Therefore, the fields 2050, 2060 and 2070 among the respective fields identifying the referenced region information are expressed as including variables such as loop control variables.

Figure 25:
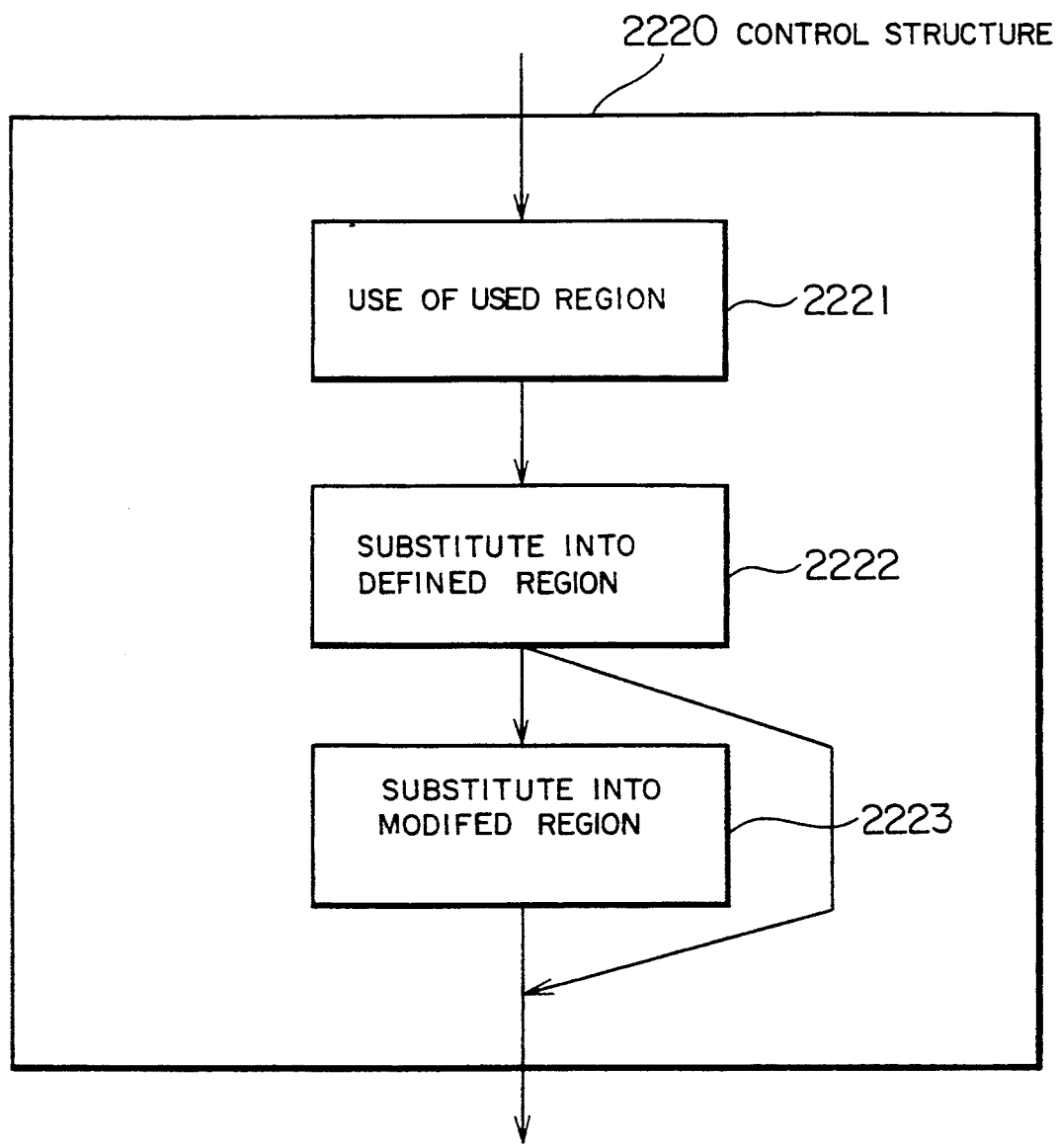
FIG. 25 shows how referenced region information is used for intraprocedural optimization.

Referring back to the flow chart of FIG. 23, at the next step 222, the referenced region information at the CALL site 2000 formed at step 221 is utilized for the known intraprocedural dataflow analysis. In this intraprocedural dataflow analysis, the referenced region information at the CALL site 2000 is utilized with an assumption that each procedure call is equivalent to the statements having the control structure indicated at 2220 in FIG. 25. A statement 2221 uses the entirety of the used region, a statement 2222 substitutes values into the entirety of the defined region, and a statement 2223 substitutes values into the entirety of the modification region. The statement 2223 is positioned under a branch at the statement 2222, which indicates that the statement 2223 is not necessarily executed, and accordingly the variable/array values are not necessarily rewritten in the modification region. The statement 2221 is not positioned under the branch, which indicates that the used region is necessarily used. Since there is no need of discriminating between the possibility and necessity of use, this statement can be used as it is.

Figure 30:
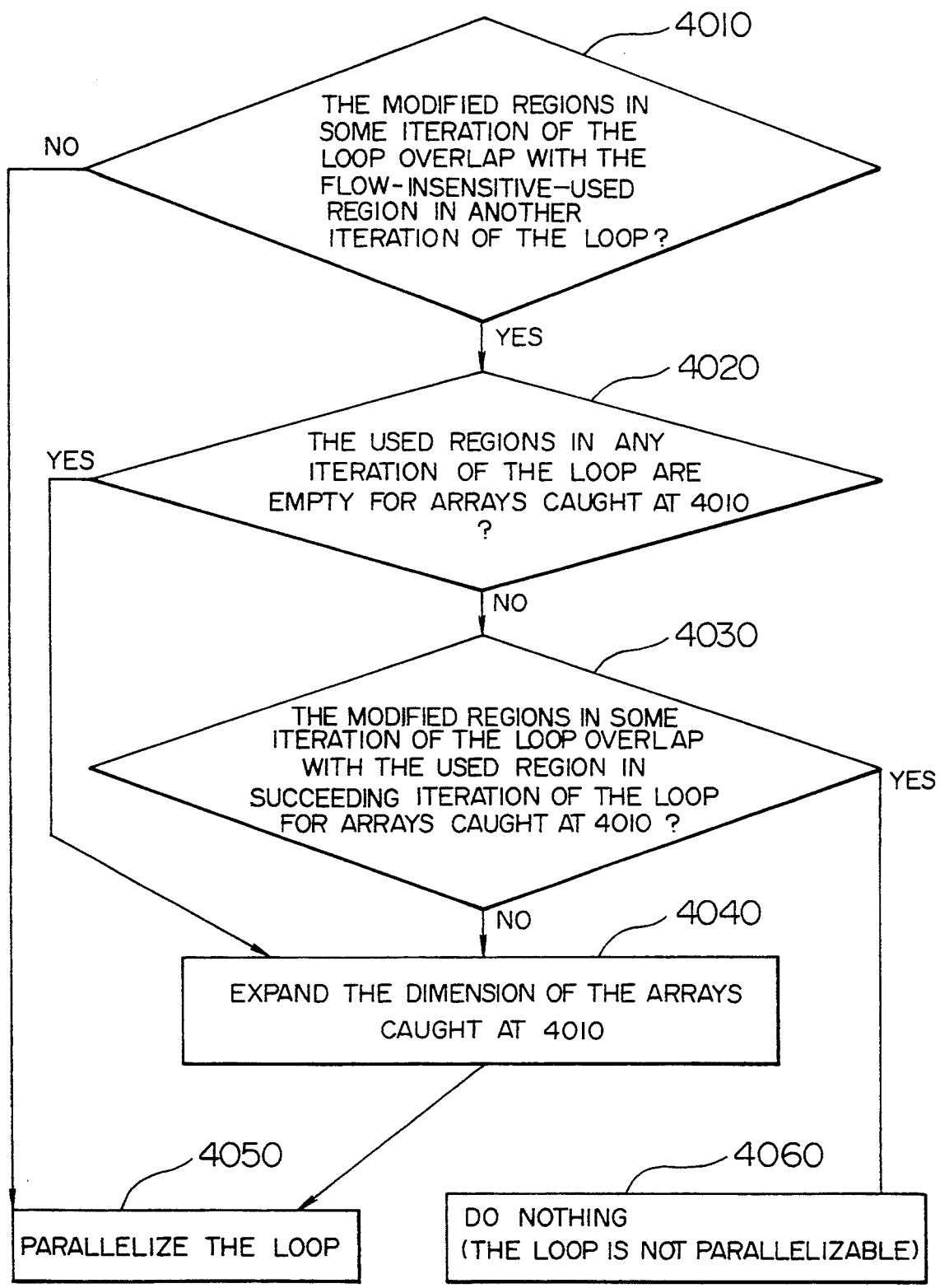
FIG. 30 is a flow chart of a portion of the optimizing processing (222 of FIG. 23) for a parallelizing a DO loop.

FIG. 30 is a flow chart showing an optimization process for parallelizing a loop (e.g., the loop DO 10 in FIG. 20) which references the same region a plurality of times. This process corresponds to the intraprocedural optimization step 222 (FIG. 23) and is applied, for example, to the program parallelization shown in FIG. 20.

At step 4010, it is judged whether the modified regions in some iteration of the loop overlap with used regions in any other iteration of the loop. This step is a conventional parallelization judgment step, and the used region is a conventional used region which does not consider the order of definition and use. If the judgment result is negative, the loop can be parallelized without any additional process. According to the prior art, if the judgment result is positive, parallelization was impossible. However, according to the present invention, the process advances to step 4020. Steps 4020 to 4040 are new steps added in this embodiment. At step 4020 it is judged whether the used regions (as defined by the present embodiment) of arrays judged at step 4010 as having an overlap are empty for any iteration of the loop. If this judgment is positive, the process advances to step 4040 to expand the dimension of all arrays judged at step 4010 as having an overlap, and at step 4050 the loop is parallelized. If the judgment at step 4020 is negative, the process advances to step 4030 whereat it is judged whether modified regions of arrays in the iteration of the loop judged at step 4010 as having an overlap, overlap with the used regions (as defined by the present embodiment) in any succeeding iteration of the loop. If this judgment is positive, the process advances to step 4040 to expand the dimension of the arrays. If the judgment is negative, the loop cannot be parallelized, so that the process terminates at step 4060 without executing a further step.

In the example shown in FIG. 20, the array V satisfies the condition of step 4010, the judgment result at step 4020 is positive, and so the dimension of V is expanded at step 4040. The program at the left side of FIG. 20 is transformed into the program at the right side. The description for FIGS. 25 and 23 has been completed as above.

Figure 22:
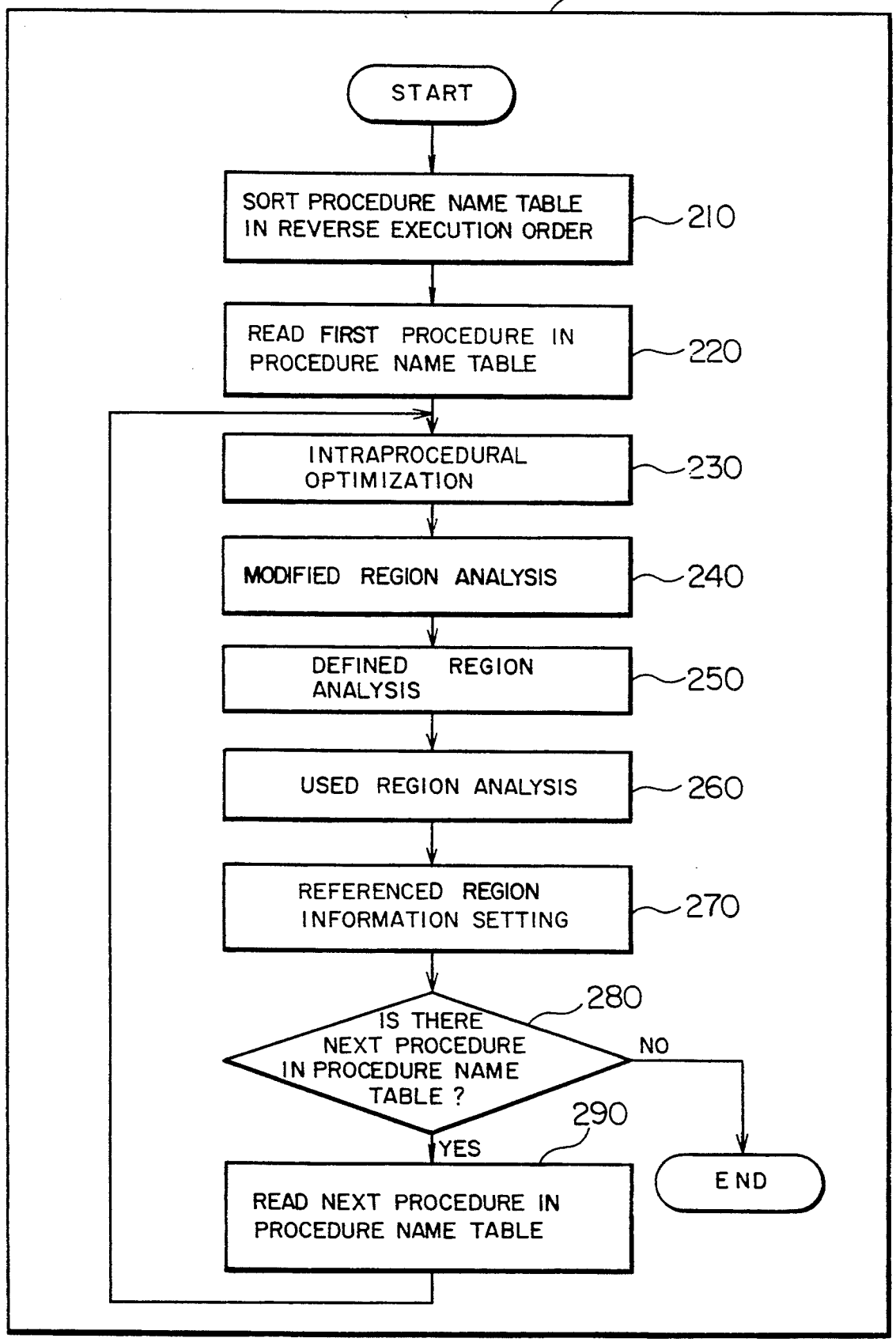
FIG. 22 is flow chart showing the operation of an interprocedural dataflow analysis unit.
Figures 23, 24:
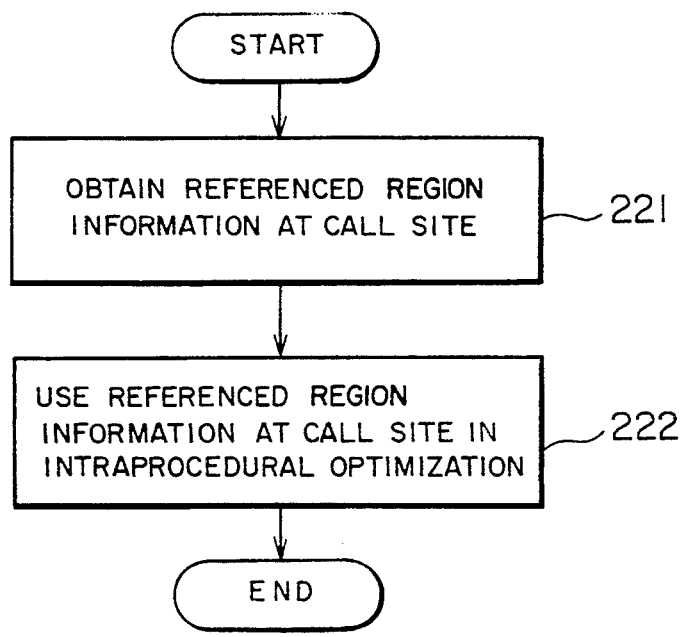
FIG. 23 is a flow chart showing the operation of intraprocedural optimization.
FIG. 24 shows an example of referenced region information at procedure call sites.

Reverting to the flow chart of FIG. 22, the operation of the interprocedural dataflow analysis unit 200 will be further described.

The step 240, the modified region is analyzed. This analysis is shown in the paper incorporated in the description of related art, so that the detail thereof is omitted.

Figure 26:
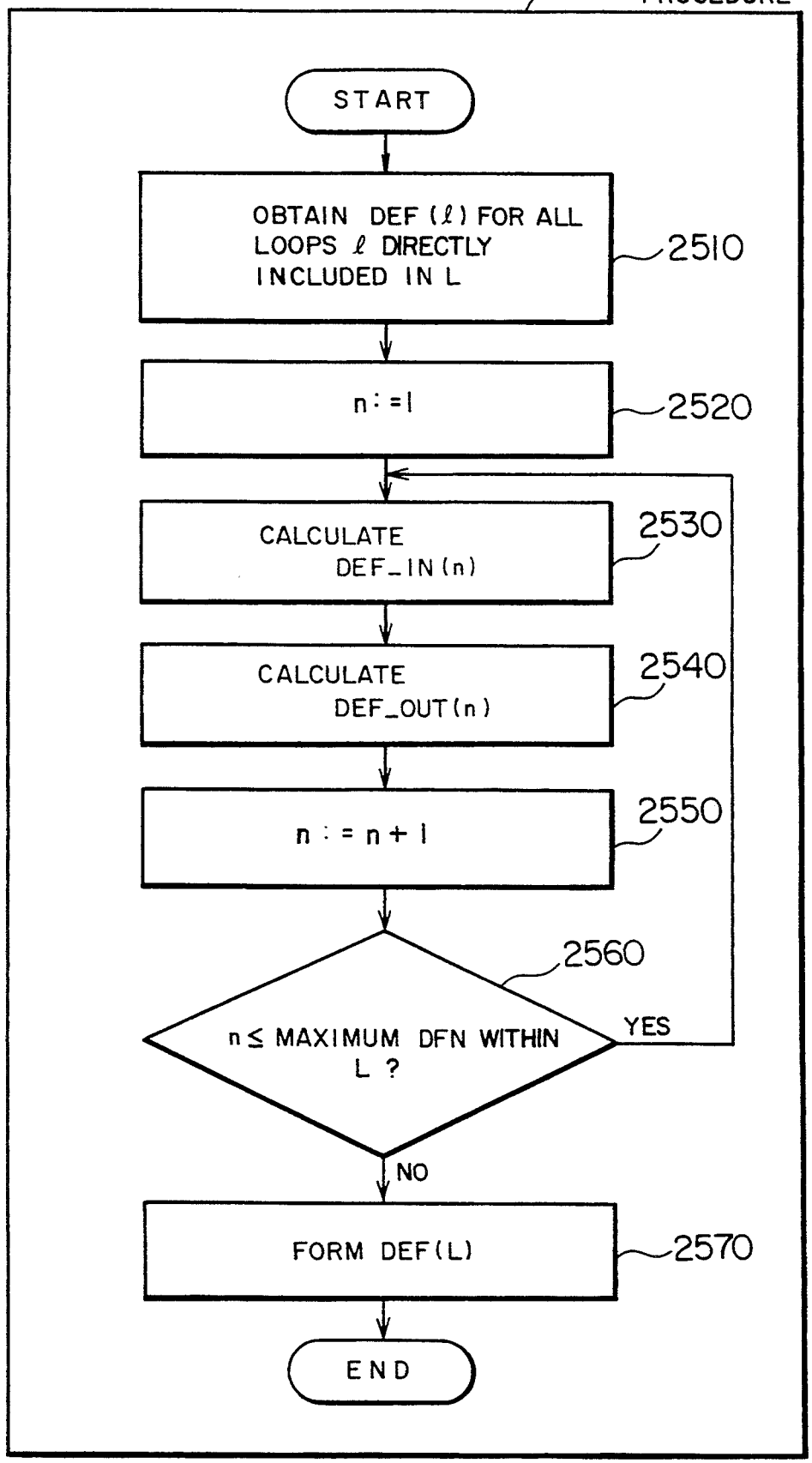
FIG. 26 is a flow chart illustrating the procedure of analyzing a defined region.

At step 250, the defined region is analyzed. In this analysis, a virtual loop LP is considered whose loop number is 1 and which contains therein all statements of a given procedure. Using LP as an argument, a process indicated at 2500 in FIG. 26 is called. This process obtains a defined region (called DEF(*)) which is necessarily defined by a loop L given as an argument. DEF(LP) is the defined region for the given procedure.

The process 2500 processes global variables and dummy arguments unless otherwise specified.

At step 2510, DEF(1) for all loops 1 directly contained in the loop L is obtained by recursively calling the process 2500. A loop directly contained in the loop L is the outermost loop among loops contained in the loop L. The loop directly contained in the loop L is processed hereinafter assuming it as one statement within the loop L. At step 2520, a variable n representative of a DFN number attached to a statement within the loop L is set as 1. The DFN number is a number attached to each statement in accordance with a Depth First Numbering algorithm. The DFN number of a statement to be executed, in the control flow starting from the loop entry, is smaller than that of a statement to be executed after the former statement. A statement whose DFN number is 1 is a statement at the loop entry.

Next, at steps 2530 and 2540, DEF_IN(n) and DEF_OUT(n) are calculated. DEF_IN(n) is a set of regions necessarily defined by the statements from the loop input to the immediately before the n DFN number statement (indicated by Sn hereinafter), and DEF_OUT(n) is a set of regions necessarily defined by the statements from the loop input to the immediately after Sn. In case of a region, such a set of regions is expressed directly by a representation including control variables of the loop and variables changing in the loop. For instance, in the program shown by the flow chart of FIG. 28, the sets are given in the form of:

DEF_OUT(5)={A(I, J), A(I, J+1)}
DEF_IN(6)={A(I, J)}
DEF_OUT(6)={A(I, J), B(I, J)}

DEF_IN(n) and DEF_OUT(n) are calculated as follows:

$$DEF\_IN(n) = \begin{cases} \bullet \text{ if } n = 1, \phi \text{ (empty set)} \\ \bullet \text{ if } n \neq 0, \bigcap_p DEF\_OUT(p) \end{cases}$$

where $\bigcap_p DEF\_OUT(p)$ represents an intersection set of DEF_OUT(p) for all DFN numbers p of the statements before Sn a statement whose DFN number is in the control flow.

DEF_OUT(n)=DEF_IN(n)∪DEF0(n)

where DEF0(n) is set of defined regions by statements Sn. If a statement Sn is a substitution statement, input statement, or the like, the set is composed of regions at the destinations of the substitution or input statement Sn. If a statement Sn is a procedure call, the set is composed of defined regions at the CALL site. If a statement Sn is a loop (indicated by 1) directly contained in the loop L, the set is composed of DEF(1). a∪b is a sum of sets a and b, which represents, in the case of regions, a sum of elements of the part regions of the same array among the sets a and b.

Next, at step 2550, n is incremented by 1. At step 2560 it is judged if n is equal to or smaller than the maximum DFN number within the loop L (indicated by DFNmax hereinafter). If YES, the control advances to step 2530, whereas if NO, the control advances to step 2570.

Since the process at step 2540 is carried out in the ascending order of DFN number and the DFN number is assigned as described above, it is assured that the value of DEF_OUT(p) has been calculated by the time when the value of DEF_OUT(n) is calculated.

At step 2570, using a set DEF_OUT(DFNmax) of variable regions necessarily defined at the statements from the loop L input to the output thereof, the loop L defined region DEF(L) is calculated as follows:

DEF(L)=extend (DEF_OUT(DFNmax), L)

where extend(r, l) represent the transformation which transform variable in r to itself and region in r to another region in which loop index change by loop 1 was incorporated to the region in r. That means if the expression of the region includes variables changing in the loop 1, that variable should be replaced by expression like a:b:c as described before.

Figure 28:
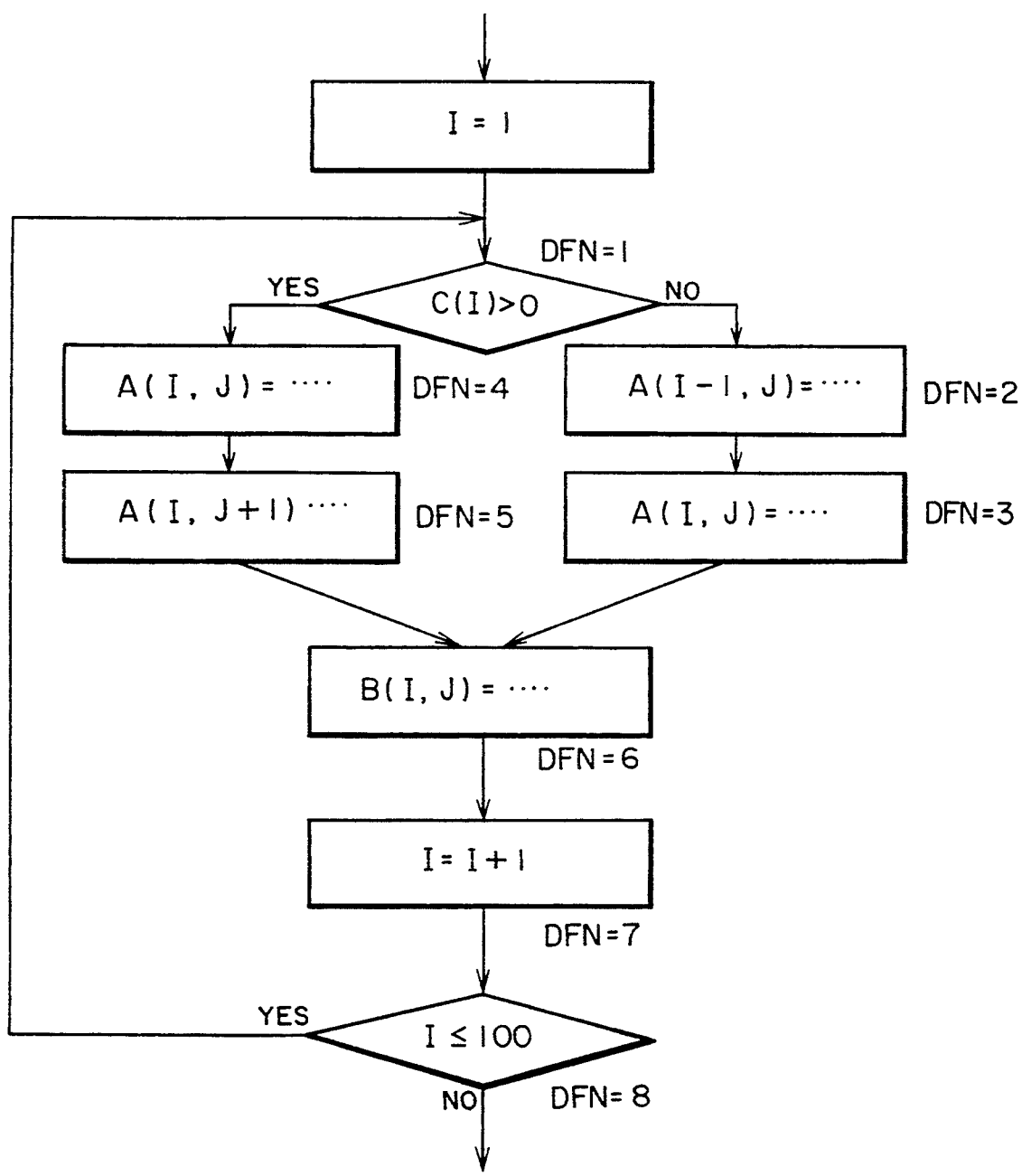
FIG. 28 is a flow chart showing an example of a program to be used for explaining the operation of analyzing a defined region.

For instance, in the program shown by the flow chart of FIG. 28, the representation becomes:

DEF_OUT(DFNmax)=DEF_OUT(8)={A(I, J), B(I, J)}

Since I of the loop L increases from 1 to 100 with an increment 1, it follows that:

DEF(L)={A(1:100:1, J), B(1:100:1, J)}

The description of the process 2500 shown in FIG. 26 for the defined region analysis step 250 has thus been given. As described previously, the process 2500 is called using as the argument the virtual loop LP containing the entirety of the procedure, to obtain the defined region (equal to DEF(LP)) of the procedure.

Figure 27:
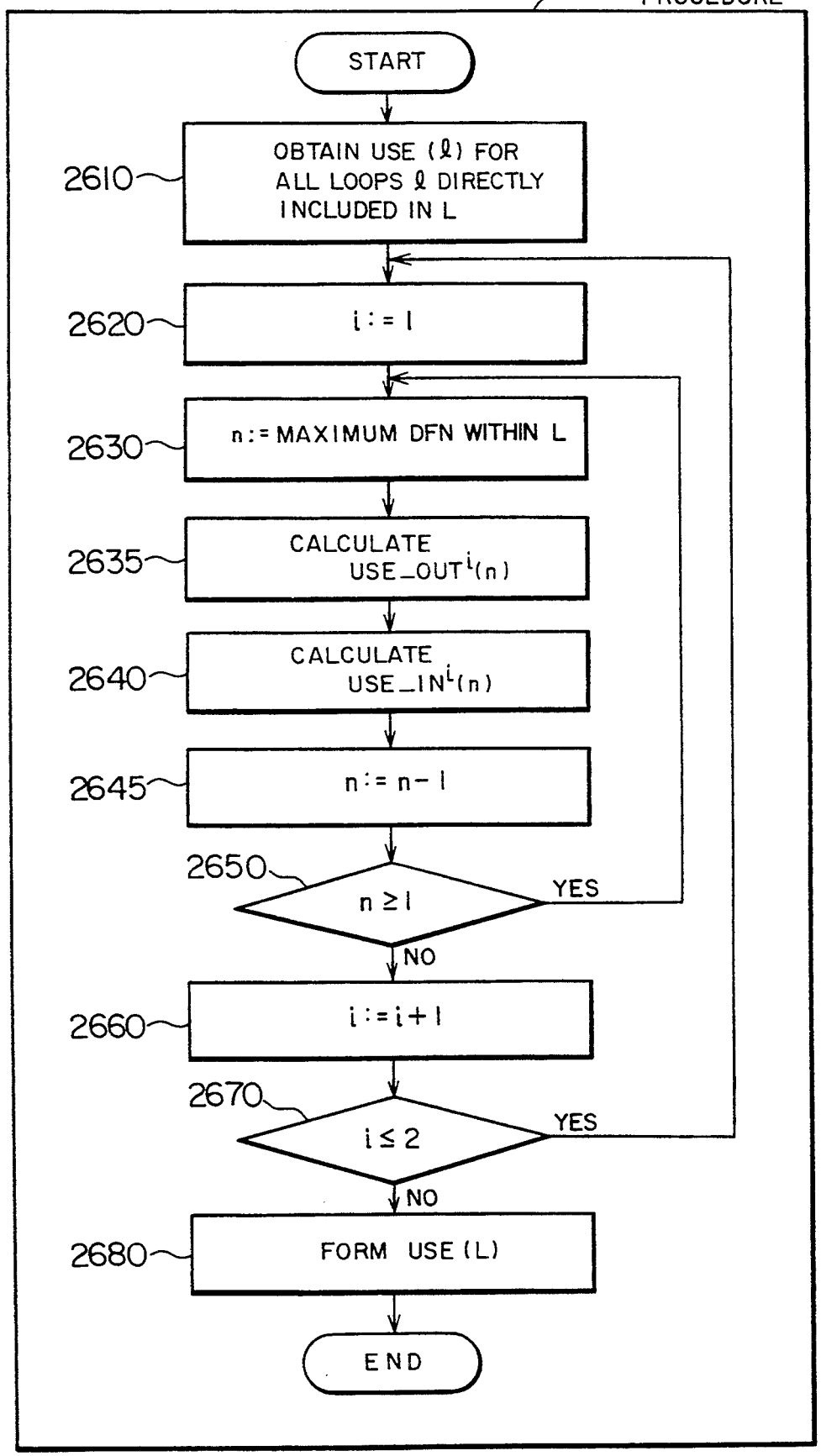
FIG. 27 is a flow chart illustrating the procedure of analyzing a used region.

Again reverting to the description for FIG. 22, at step 260, the used region is analyzed. In this analysis, a process 2600 shown in FIG. 27 is called using as the argument the virtual loop LP. The process 2600 which obtains the used region (called USE(*) hereinafter) for a given loop L is called to obtain USE(LP) which is used as the used region of the given procedure. The process 2600 shown in FIG. 27 processes global variables and dummy variables unless otherwise specified. The process 2600 will be described hereinunder.

At step 2610, the process 2600 is recursively called for all loops l directly contained in the loop L, to obtain USE(1). At step 2620, i is set at 1. i is a variable which indicates for how many preceding loop iterations the use of a variable region is alive. The region is alive when it is used before any definition of the region. In this embodiment, the used region is analyzed only for i of 1 and 2 so that the use of a region which is alive over the preceding 2 loop iterations is considered as having a possibility of being alive over any number of preceding loop repetitions.

The alive use of a variable region as defined in this embodiment suffices in practical use. However, the alive use may be defined as any one of i=1, 2, ..., m, m+1 and more.

At step 2630, a variable n holding a DFN number is set at a maximum DFN number within the loop L. At steps 2635 and 2640, $USE\_OUT^i(n)$ and $USE\_IN^i(n)$ are calculated. $USE\_OUT^i(n)$ is a set of regions having a possibility of being used by the statements within a span from the immediately after Sn to the loop exit after (i−1) loop L repetitions. $USE\_IN^i(n)$ is a set of regions having a possibility of being used by the statements within a span from the immediately before Sn to the loop exit after (i−1) loop L iterations. For instance, in the program shown by the flow chart of FIG. 29, the steps are given by:

$USE\_IN^1(5)=\{A(I-1), J)\}$
$USE\_IN^1(1)=\{A(I-1, J), A(I, J-1)\}$
$USE\_OUT^2(1)=\{A(I, J-1)\}$ $USE\_OUT^2(2)$ does not include $A(I-1, J)$. The reason for this is that the value of $A(I-1, J)$ is necessarily redefined through substitution into $A(I, J)$ by S5 and S3 at the next iteration of the loop, resulting in no aline at the immediately after S1 on preceding iteration of the loop. $USE\_OUT^i(n)$ and $USE\_IN^i(n)$ are calculated as follows:

$$USE\_OUT^i(n) = \begin{cases} \bullet \text{ if } n = DFNmax, \\ \quad \text{if } i = 1, \phi \text{ (empty SET)} \\ \quad \text{if } i \neq 1, USE\_IN^{i-1}(1). \\ \bullet \text{ if } n \neq DFNmax \\ \quad \bigcup_s USE\_OUT^i(s) \end{cases}$$

where $\bigcup_s USE\_OUT(s)$ represents a sum of USE_OUT(s) for all DFN numbers s of the statements immediately after Sn (statement whose DFN number is n) in the control flow.

$$USE\_IN^i(n) = \begin{cases} \bullet \text{ if } i = 1, \\ \quad \left(USE\_OUT^i(n) \frac{i}{L} DEF0(n)\right) \cup USE0(n) \\ \bullet \text{ if } i \neq 1, \\ \quad USE\_OUT^i(n) \frac{i}{L} DEF0(n) \end{cases}$$

where USE0(n) is set of used regions by statements Sn. If a statement Sn is a substitution statement, input statement or the like, the set is composed of regions to be used or outputted at statements Sn. If a statement Sn is a procedure call, the set is composed of used regions at the CALL site. If a statement Sn is a loop (indicated by l) directly contained in the loop L, the set is composed of USE(l).

$$a \frac{i}{L} b$$

is a substraction result of a set b from a set a, which represents, in the case of regions, a substraction of elements of the regions (indicated at $r_b$) contained in the set b from elements of the regions (indicated by $r_a$) contained in the set a of the same array. It is assumed however in the subtraction of $r_b$ from $r_a$ that the loop L execution for $r_b$ is (i−1) times before the execution for $r_a$. For instance, in the program shown by the flow chart of FIG. 29, the calculation of USE_IN² (5) is carried out by $$\text{USE\_OUT}^2(5) \frac{2}{L} \text{DEF0}(5)$$

which value is given by:

$$\text{USE\_OUT}^2(5) \frac{2}{L} \text{DEF0}(5) =$$

$$\{A(I-1,J), A(I,J-1)\} \frac{2}{L} \{A(I,J)\} = \{A(I,J-1)\}$$

because A(I−1, J) coincides with A(I, J) at the preceding iteration of loop L.

Since the process at step 2640 is carried out in the descending order oF DFN number and the DFN number is assigned as described above, it is assured that the value of USE_IN$^i$(s) has been calculated already.

Next, at step 2645 n is decremented by 1. At step 2650 it is judged if n is 1 or more. If YES, the control advances to step 2620. If NO, the control advances to step 2660 where i is incremented by 1. If i is 2 or less at step 2670, the control advances to step 2620. If NO, the control advances to step 2680 where USE(L) is calculated as follows:

$$\text{USE(L)} = \text{const}\left(\text{USE\_IN}^1(1) \frac{1}{L} \text{USE\_IN}^2(1), L, 1\right) \cup$$

$$\text{extend}(\text{USE\_IN}^2(1), L)$$

where const(r, l, c) has a representation wherein, in indices of r elements in the region, those variables changing the values thereof at each iteration of loop L execution are replaced with the values of the variables at the c'th iteration of the loop L execution.

Figure 29:
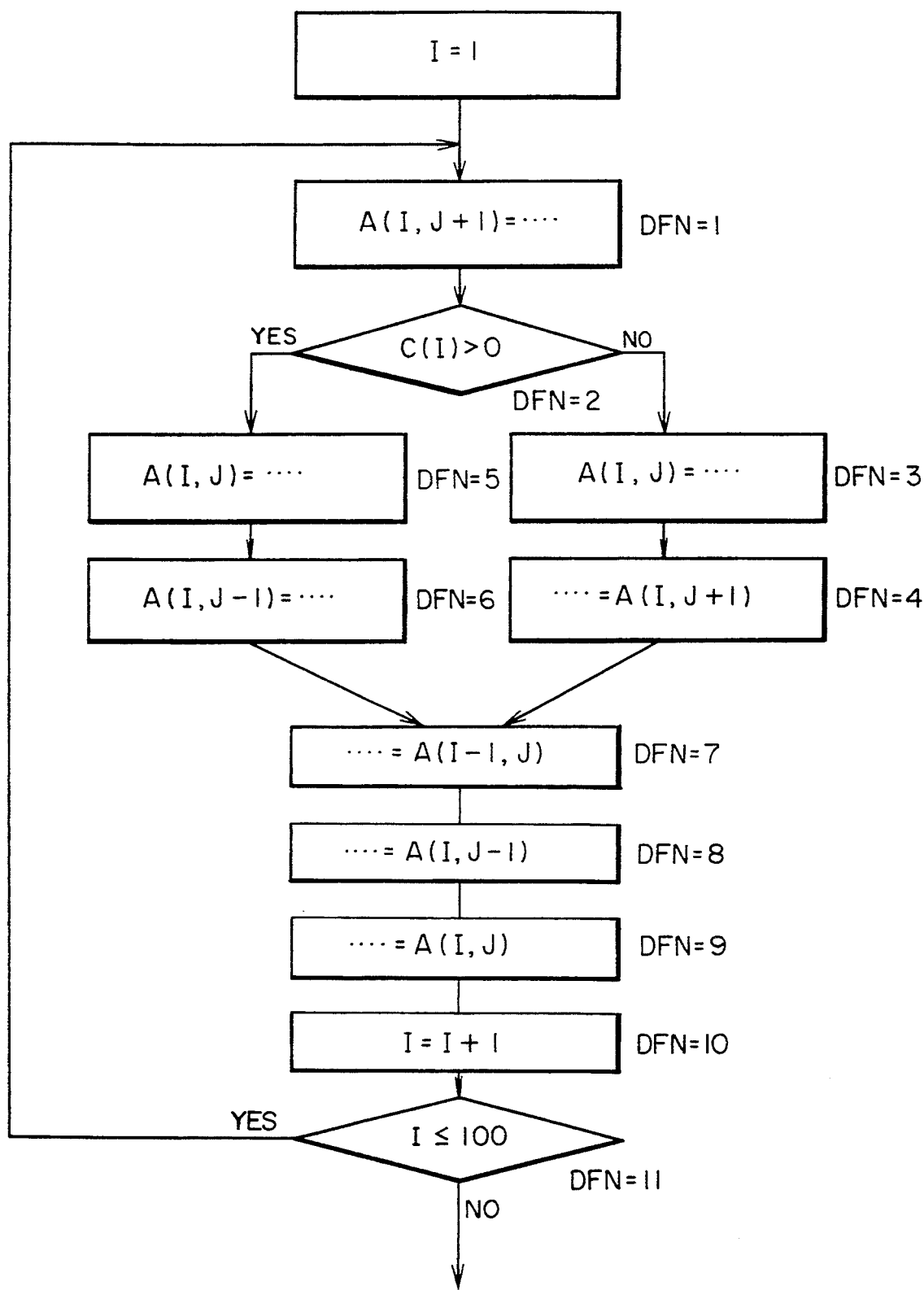
FIG. 29 is a flow chart showing an example of a program to be used for explaining the operation of analyzing a used region.

For instance, in the loop (called L) of the program shown by the flow chart of FIG. 29, USE(L) is calculated as follows:

$$\text{USE(L)} = \text{const}\left(\text{USE\_IN}^1(1) \frac{1}{L} \text{USE\_IN}^2(1), L, 1\right) \cup$$

$$\text{extend}(\text{USE\_IN}^2(1), L)$$

$$= \text{const}\left(\{A(I-1,J), A(I,J-1)\} \frac{1}{L} \{A(I,J-1)\}L, 1\right\}$$

$$\cup \text{extend}(\{A(I,J-1)\}, L)$$

$$= \text{const}(\{A(I-1,J), L, 1\}) \cup$$

$$\{A(I:100:1, J-1)\}$$

$$= \{A(0,J)\} \cup \{A(I:100:1, J-1)\}$$

$$= \{A(0,J), A(I:100:1, J-1)\}$$

The description of the process 2600 shown in FIG. 26 for the used region analysis step 260 has thus been given. As described previously, the process 2600 is carried out with respect to the virtual loop LP containing the entirety of the procedure, to thus obtain the used region (equal to USE(LP)) of the procedure.

Referring again back to FIG. 22, the description of the interprocedural dataflow analysis 200 will be further given.

At step 270, the modified region, defined region and used region obtained at steps 240 to 260 are set in the referenced region information 400. As described previously, the referenced region information 400 of the procedure OPROD of the program shown in FIG. 2 for example becomes as shown in FIG. 6 at 401.

Next, at step 280, it is judged if the next procedure is present in the procedure name list 700 or not. If YES, the control advances to step 290 where the next procedure in the procedure name list is read to thereafter advance to step 230 for analysis of the next procedure. If NO, the control terminates.

As described above, the process at the interprocedural dataflow analysis unit 200 is performed such that each procedure is processed in the reverse execution order to obtain the referenced region information 400 of each procedure.

The description for the interprocedural dataflow analysis unit 200 has thus been completed.

Figure 7:
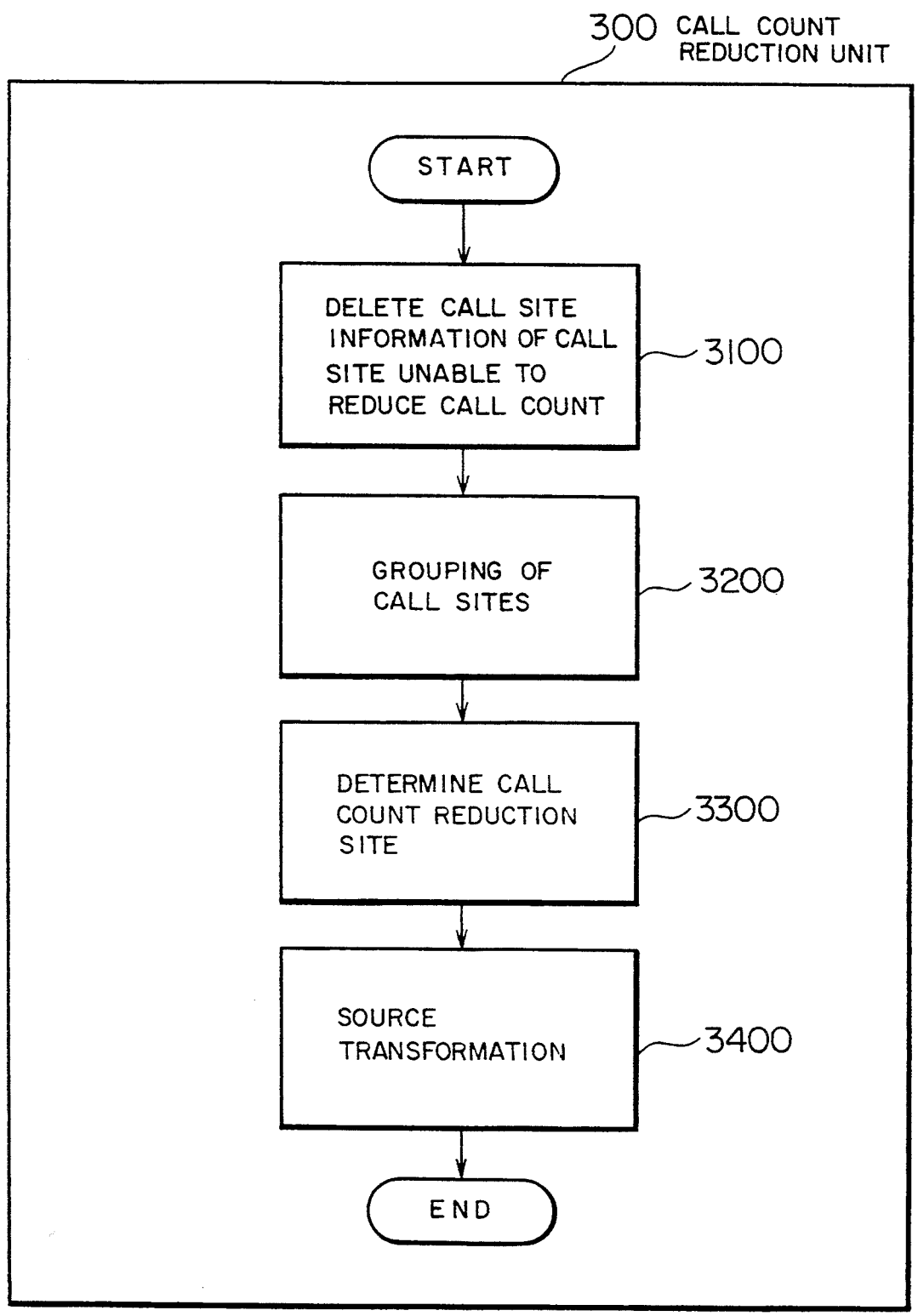
FIG. 7 is a flow chart showing the outline of the operation of call count reduction unit.

Next, the operation of the CALL count reduction unit 300 shown in FIG. 1 will be described with reference to the flow chart shown in FIG. 7.

At step 3100, a part of CALL site information of a CALL site is deleted to exclude the CALL site from the following processes because if the loop cannot be split with respect to the CALL site then the CALL count reduction is not possible. At step 3200, CALL sites which can share a copy of a callee procedure as the destination of loop move are grouped in unity. At step 3300, a CALL site for CALL count reduction is determined based on the CALL count information. At step 3400, the source program 10 is actually rewritten to perform CALL count reduction and outputted to the CALL count reduced source program 15.

The operations at steps 3100 to 3400 will be further described with reference to other Figures.

Figure 8:
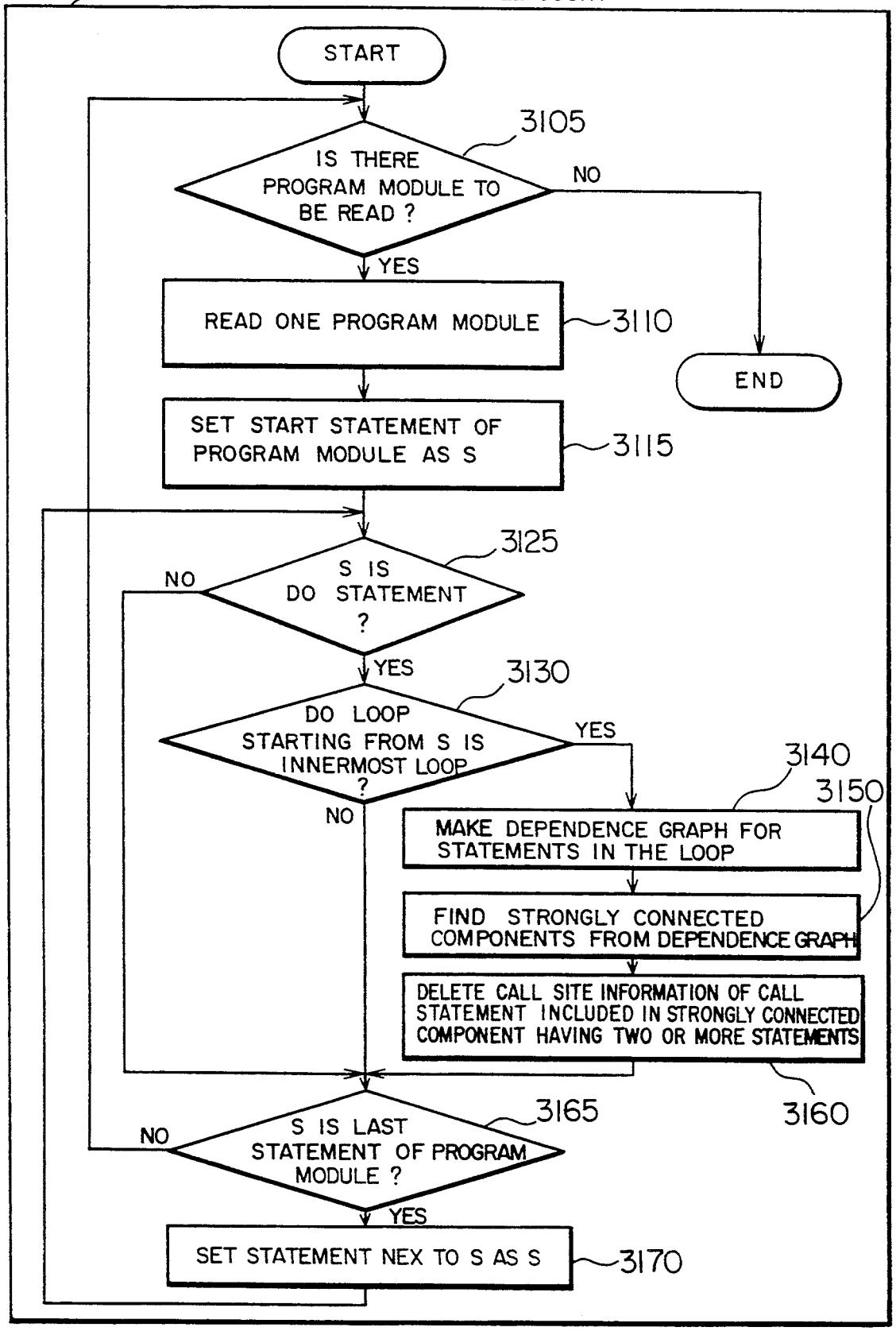
FIG. 8 is a flow chart showing the operation of deleting CALL site information whose call count is unable to be reduced.

First, the operation at step 3100 where the CALL site information of a CALL site unable to reduce CALL count will be detected will be described with reference to FIG. 8.

Figure 4:
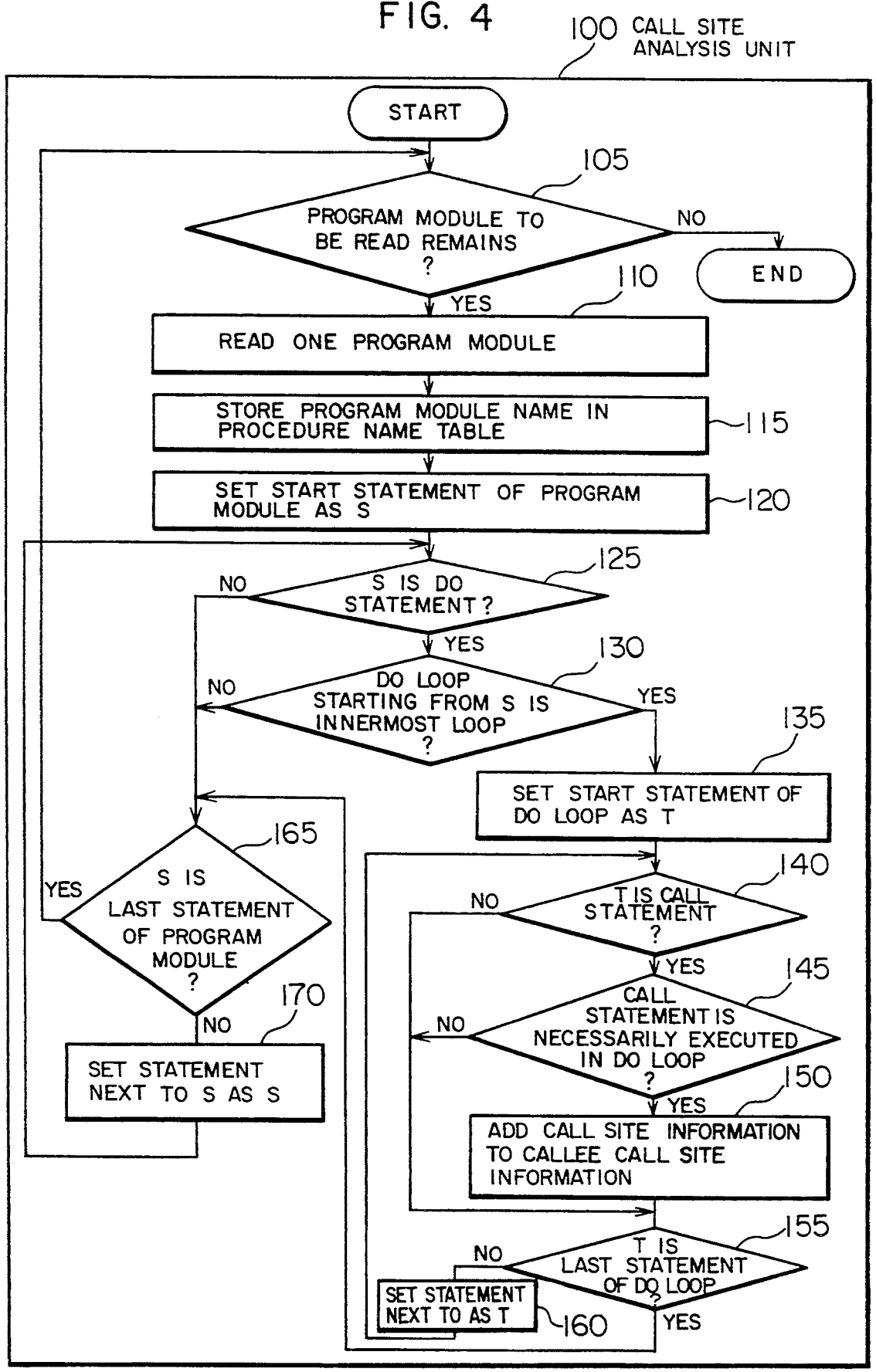
FIG. 4 is a flow chart showing the operation of a CALL site analysis unit.

Steps 3105 to 3130 and steps 3165 to 3170 are the same as steps 105 to 130 and steps 165 to 170 shown in FIG. 4 except step 115 where the name of a program module is stored in the procedure name table. Namely, only for the innermost loop of each program procedure, steps 3140 to 3160 are executed. At step 3140, a dependence graph for statements in the innermost loop is formed using the referenced region information 600. At step 3150, a strongly connected component is derived out of the dependence graph. The dependence graph is a directional graph indicating the execution order of statements based on the dependence of data reference, and the connected component is a subgraph portion which forms a cycle within the directional graph.

At step 3140 for forming the dependence graph, the referenced region information 600 outputted from the interprocedural dataflow analysis unit 200 is used. Step 3140 for forming the dependence graph is known in the art except the manner to use the referenced region information 600, which manner is the same as described with the interprocedural dataflow analysis step 222 shown in FIG. 23. The dependence within a loop having a procedure call can thus be analyzed. However, a conventional intraprocedural dependence analyzing method cannot analyze precisely if a referenced region in an iteration of a loop is not a single array element but a region. In this embodiment, a dependence analysis is performed in accordance with an algorithm shown in the flow chart of FIG. 31. This algorithm is applied only to an array which has been judged by the conventional dependence analysis method as having a dependence between iterations of a loop. Use of this algorithm settles a conventional poor precision of dependence analysis.

Figure 31:
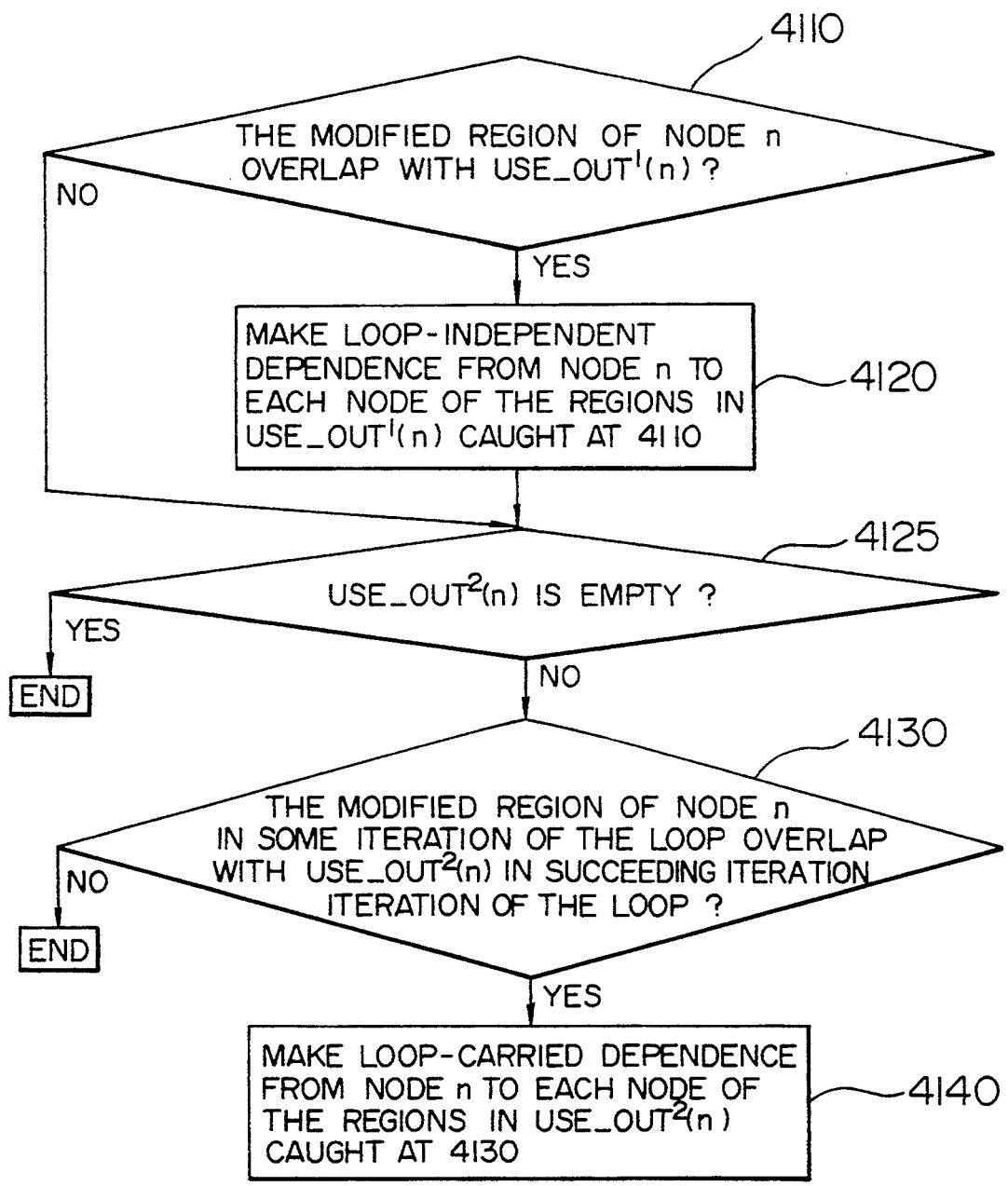
FIG. 31 is a flow chart of a dependence analysis within the loop (3140 of FIG. 8).

USE_OUT$^i$(n) and USE_IN$^i$(n) represent the information previously described when analyzing used regions. In order to indicate the position of a region reference within a loop, the node number of the position is provided to each region in the information. The algorithm shown in FIG. 31 is repeated for each node n to analyze the dependency between nodes in the loop.

At step 4110 it is judged whether the modified region of the node n overlaps with USE_OUT$^1$(n). If this judgment result is negative, the process advances to step 4125, and if positive, the process advances to step 4120 to establish a loop-independent dependence from the node n to each node referencing the regions in USE_OUT$^1$(n) caught at step 4110. At step 4125 it is judged if USE_OUT$^2$(n) is empty. If this judgment is positive, the process is terminated, and if negative, the process advances to step 4130.

At step 4130, it is judged whether the modified region of the node n in some iteration of the loop overlaps with USE_OUT$^2$(n) in any succeeding iteration. If this judgment is negative, the process is terminated, and if positive, the process advances to step 4140 to establish a loop-carried dependence from the node n to each node referencing the regions in USE_OUT$^2$(n) caught at step 4130.

The manner to derive the strongly connected component is also known in the art so that the detailed description therefor is omitted.

The dependence graph for ISN 5 to 10 of procedure WWQ of the FORTRAN source program shown in FIG. 2 will be described by way of example with reference to FIG. 9.

Figure 9:
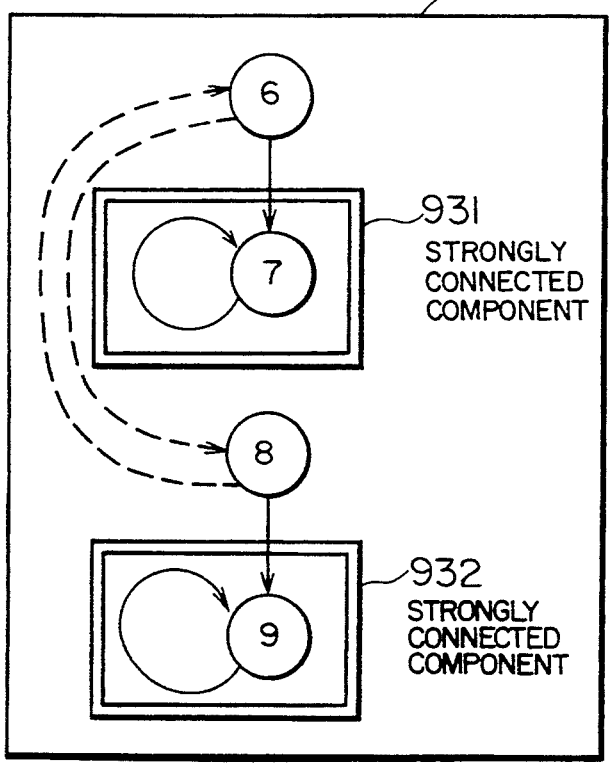
FIG. 9 shows a dependence graph and illustrates strongly connected components.

The dependence relations at data reference sites within the source program are shown indicated at 910 in FIG. 9. The dependence relations include: a flow dependence relation indicating that respective elements of array TMP whose values have been set upon procedure OPROD CALL at ISN 6 statement are used at ISN 7 statement; a flow dependence relation indicating that variables SQ whose values have been set at ISN 7 statement are used in this statement; a flow dependence relation indicating that respective elements of array TMP whose values have been set upon procedure OPROD CALL at ISN 8 statement are used at ISN 9 statement, and a flow dependence relation indicating that variables SA whose values have been set at ISN 9 statement are used in this statement.

The dependence graph among statements and its strongly connected components formed in accordance with block 910 are shown indicated at 920 in FIG. 9.

According to the present invention, the referenced region information discriminating between the possibility and necessity is used as the summary information of data reference at a procedure call. Thus, it can be seen that all elements of TMP which stand for the third argument of procedure OPROD are necessarily defined without use of the elements of that array before the definition, and that there is no flow dependence between ISN 6 statement and ISN 8 statement. However, conventionally it has been analyzed that there is a flow dependence of ISN 6 statement upon ISN 8 statement, and vice versa. Therefore, both ISN 6 and 8 statements have been analyzed as constituting strongly connected components and as including two procedure calls therein. As a result, it has been analyzed that a loop division at each procedure is not possible and hence CALL count reduction is not possible.

Referring back to FIG. 8, at step 3160, the CALL site information of a CALL statement contained in the strongly connected component having two or more statements is deleted. This is done because the strongly connected component cannot be split into two subloops and accordingly loop split with respect to the procedure call contained in the strongly connected component is not possible, which makes CALL count reduction unable to be performed.

Figure 10:
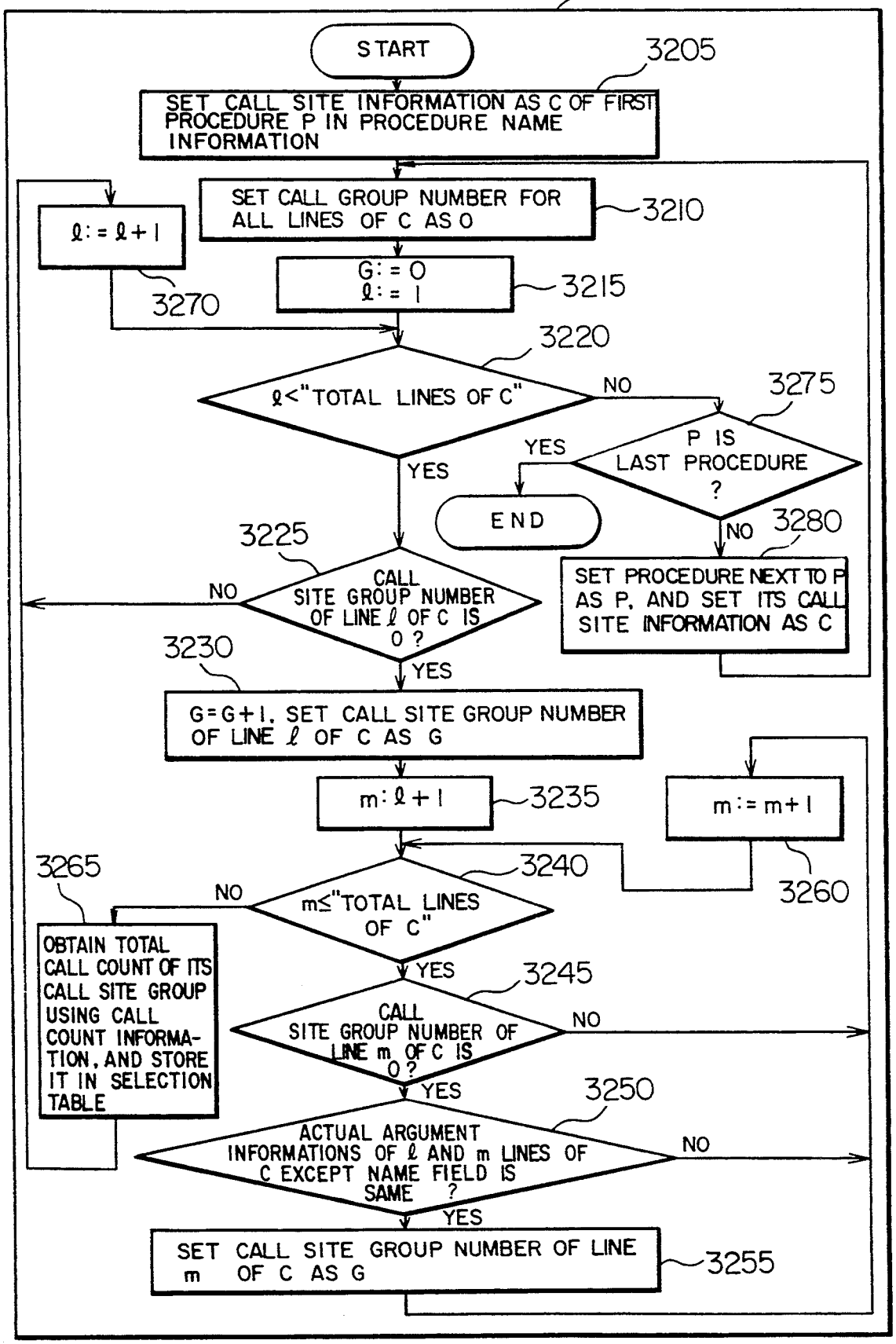
FIG. 10 is a flow chart showing the operation of grouping of CALL sites.

Next, the operation of step 3200 for grouping CALL sites will be described with reference to FIG. 10.

At step 3205, a procedure stored at the top of the procedure name information table 700 is set as P, and the CALL site information thereof is set as C. At step 3210, a CALL site group number 1220 for all lines of C is set at 0 to indicate that the CALL group number has not been determined as yet. At step 3215, a variable G indicating the number of CALL site groups is set at 0, and a variable l indicating the line number of C is set at 1. At step 3200, it is judged if l is smaller than the "the number of all lines of C". If YES, the control advances to step 3225, whereas if NO, the control advances to step 3275 where it is judged of P is the last procedure stored at the end of the procedure name table 700. If YES, the control terminates, whereas if NO, the control advances to step 3280 where the procedure next stored in the procedure name table is set as P, and the CALL site information thereof is set as C to thereafter advance to step 3210 for processing the next procedure. At step 3225, it is judged if the CALL site group number at the line l of C is 0 or not. If YES, the control advances to step 3230, whereas if NO, the control advances to step 3270 where the value of l is incremented by 1 to thereafter advance to step 3220 for processing the next line of C. At step 3230, the value of G is incremented by 1 to set the value as the CALL site group number of the line l of C. At steps 3235 to 3260, the value of G is set at the CALL site group number of the CALL site which can share the copy of callee procedure. At step 3235, a variable m indicating the line following the line l of C is set at (l+1). At step 3240, it is judged if the variable m is smaller than "the number of all lines of C". If YES, the control advances to step 3245, whereas if NO, the control advances to step 3265 where the total CALL count of CALL sites with CALL site group number of G is obtained and set in the selection table 1200. FIG. 12 shows the format of the selection table 1200, which includes a field 1210 indicating the callee procedure name, a field 1220 indicating a CALL site group number, and a field 1230 indicating the total CALL count of CALL sites within the associated CALL site group. Returning back to FIG. 10, at step 3245, it is judged if the CALL site group number for the line m of C is 0 or not (i.e., if the CALL site group number has been determined or not). If YES, the control advances to step 3250, whereas if NO, the control advances to step 3260 where the value m is incremented by 1 to thereafter advance to step 3240 for processing the next line for the new value m. At step 3250, it is judged if the actual argument informations (520, 530) except that in the name field, at the lines l and m lines of C, coincide with each other. If YES, it is determined that the CALL sites at the lines l and m of C belong to the same CALL site group, and at step 3255 the value of G is set as the CALL site group number for the line m of C. In this embodiment, the CALL site group has been determined in accordance with the determination criterion at step 3250. However, the determination criterion may be changed in order to make larger the scale of the CALL site group and smaller the number of CALL site groups. With such a change, it becomes possible to reduce the number of copies at the destinations of loop transfer and hence the memory capacity.

In the case of the FORTRAN program shown in FIG. 2, the CALL site group number of CALL sites at ISN 6 and ISN 8 of procedure WWQ becomes 1 as shown in FIG. 5, and the selection table thereof becomes as shown in FIG. 12.

Next, the operation of step 3300 for determining a CALL count reduction site will be described with reference to FIG. 14.

At step 3305, the selection table 1200 is sorted in descending order for total number of CALL counts within a group. At step 3310, the reduction attribute field 730 for all lines of the procedure name table 700 is set as NULL. The value of the reduction attribute field 730 takes one of NULL, CALLER and CALLEE for each procedure. NULL indicates that the reduction attribute 730 has not been determined as yet, or the associated procedure is not concerned about CALL count reduction. CALLER indicates that the associated procedure is used as the procedure caller, and the CALL sites are subjected to CALL count reduction. CALLEE indicates that the associated procedure is used as the procedure callee and as the destination of loop transfer during CALL count reduction. The value of the reduction attribute 730 of a procedure cannot take both CALLER and CALLEE at the same time. Therefore, a loop is not further moved from the procedure indicating the destination of loop transfer from its copy, and a copy for the callee is not further made from the copy. As a result, according to the embodiment of the present invention, the number of copies of a procedure and the memory capacity are prevented from being increased exponentially.

At next step 3315, a variable l indicating the line within the selection table is set at 1. At step 3320, it is judged if the value l is smaller than the "the number of lines within the selection table". If YES, the control advances to step 3325, whereas if NO, the control terminates. At step 3325, a procedure within the caller procedure name 1210 of the CALL site group at the line l of the selection table is set as P, and the CALL site group number 1230 is set as G. At step 3330, it is judged with reference to the procedure name information 700 if the reduction attribute 730 of P is CALLEE or NULL. If YES, the control advances to step 3335, whereas if NO, the control advances to step 3355. At step 3335, with reference to the CALL site information 500, it is judged using the procedure name information 700 if the reduction attribute 730 of caller procedures having CALL sites whose CALL site group number 516 is G is CALLER or NULL. If YES, the control advances to step 3340 for performing the processes to be used for the case the CALL site group has been selected.

If NO, the control advances to step 3355 for performing the processes to be used for the case the CALL site group has not been selected.

At step 3340, the reduction attribute 730 of P within the procedure name information 700 is set as CALLEE.

At step 3345, with reference to the CALL site information 500 of P, the reduction attribute 730 of caller procedures for all CALL sites whose CALL site group number 516 is G is set as CALLER.

At step 3350, the value of l is incremented by 1 to follow the next process. At step 3355, after deleting the line l the selection table and all call sites of P, all lines of the CALL site information 500 of P whose CALL site group number is G, are deleted, to thereafter follow the next process.

As above, if the FORTRAN program shown in FIG. 2, for example, is given as the source program 10, the reduction attributes 730 of the procedure name information 700 are set as shown in FIG. 13.

Next, the operation of step 3400 for source transformation will be described with reference to FIG. 15.

At step 3405, it is judged if there remains a program module to be read. If YES, the control advances to step 3410, whereas if NO, the control terminates. At step 3410, one program module is read. At step 3415, it is judged if the reduction attribute of the read-in procedure is NULL. If YES, the control advances to step 3420 to output the read-in program module itself to the CALL count reduced source program 20, whereas if NV, the control advances to step 3425. At step 3425, it is judged if the reduction attribute 730 of the read-in procedure is CALLER. If YES, the control advances to step 3430, whereas if NO, the control advances to step 3445. Steps 3430 to 3440 are processes for the caller procedure, and steps 3445 to 3460 are processes for the callee procedure.

At step 3430, the innermost loop containing a CALL site of a CALL statement is split with respect to the CALL statement which is notified as of the target of CALL count reduction because of the remaining CALL information 500 thereof. This split is known in the art so that the detail thereof is not given. For the FORTRAN program shown in FIG. 2, ISN 6 and ISN 8 of procedure WWQ are selected as CALL sites for CALL count reduction, the resultant source program with loop split is shown in FIG. 16. As seen in this example, upon loop split, a new array (TMP #1) is introduced at 1610 to 1619, a copy of values of the newly introduced array (TMP #1) to the already existing array/variable (TMP) is performed at 1620, and other necessary operations are performed.

At step 3435, of the loops formed through the loop split, a loop which contains only a loop split originating CALL is replaced by a single CALL statement which calls a copy of the callee procedure by the original CALL statement. The procedure name of the copy is formed with reference to the procedure name from which the copy has been made and with reference to the CALL site group number 516. The formed new name should be different from the already present procedure names, and the same name should be used when this copy is called from different CALL sites. The method of forming a name in such a manner is known in the art, so that the detail thereof is not given.

Also, as to the actual argument, the instance of control variable of the innermost loop in the index formula is replaced by the initial value of the control variable.

At step 3440, the program module rewritten at steps 3430 to 3435 is outputted to the CALL count reduced source program 20.

At step 3445, the read-in program module itself is outputted to the CALL count reduced source program 20. At step 3450, it is judged if there is CALL site group in selection table 1200 not processed and whose callee procedure name is the same as read-in procedure. If YES, the control advances to step 3455, whereas if NO, the control advances to step 3405 to follow processing the next program module. At step 3455, the callee side procedure for the CALL site group is formed. At step 3460, the callee side procedure formed at steps 3450 to 3455 is outputted to the CALL site reduced source program 20.

The operation at step 3455 will be described in more detail with reference to FIG. 17. At steps 34552, the program module at the time of reading is copied to supply it as the target to be processed thereafter. At step 34554, the dimension declaration of the dummy argument is changed in accordance with the dimension declaration of the caller actual argument, to thereby extend the dimension.

At step 34556, the entire of the copy of execution statement is surrounded in the DO loop. The control variable of the loop takes an initial value of 1, an increment of 1, and the end value of the loop length 517 of the innermost loop surrounding the CALL site of the CALL site group. A RETURN statement in the program in this case is replaced by a GOTO statement to a CONTINUE statement which is added to the end of the newly added DO loop.

At step 34558, the index of the dummy argument whose dimension has been extended at step 34554 is rewritten. In this rewriting, first, the index of the newly added and extended dimension is set at 0, and thereafter, the following value is added to the index of each dimension:

i*n where i is a control variable of the newly added DO loop. n is an increment of an index change 529 of the actual argument, of the associated dimension at the innermost loop, corresponding to the dummy argument of the CALL site of the CALL site group to be processed as shown in FIG. 5.

At step 34559, the name of copy procedure is changed. The new procedure name is formed in the manner similar to the description with step 3435 of FIG. 15.

Figure 15:
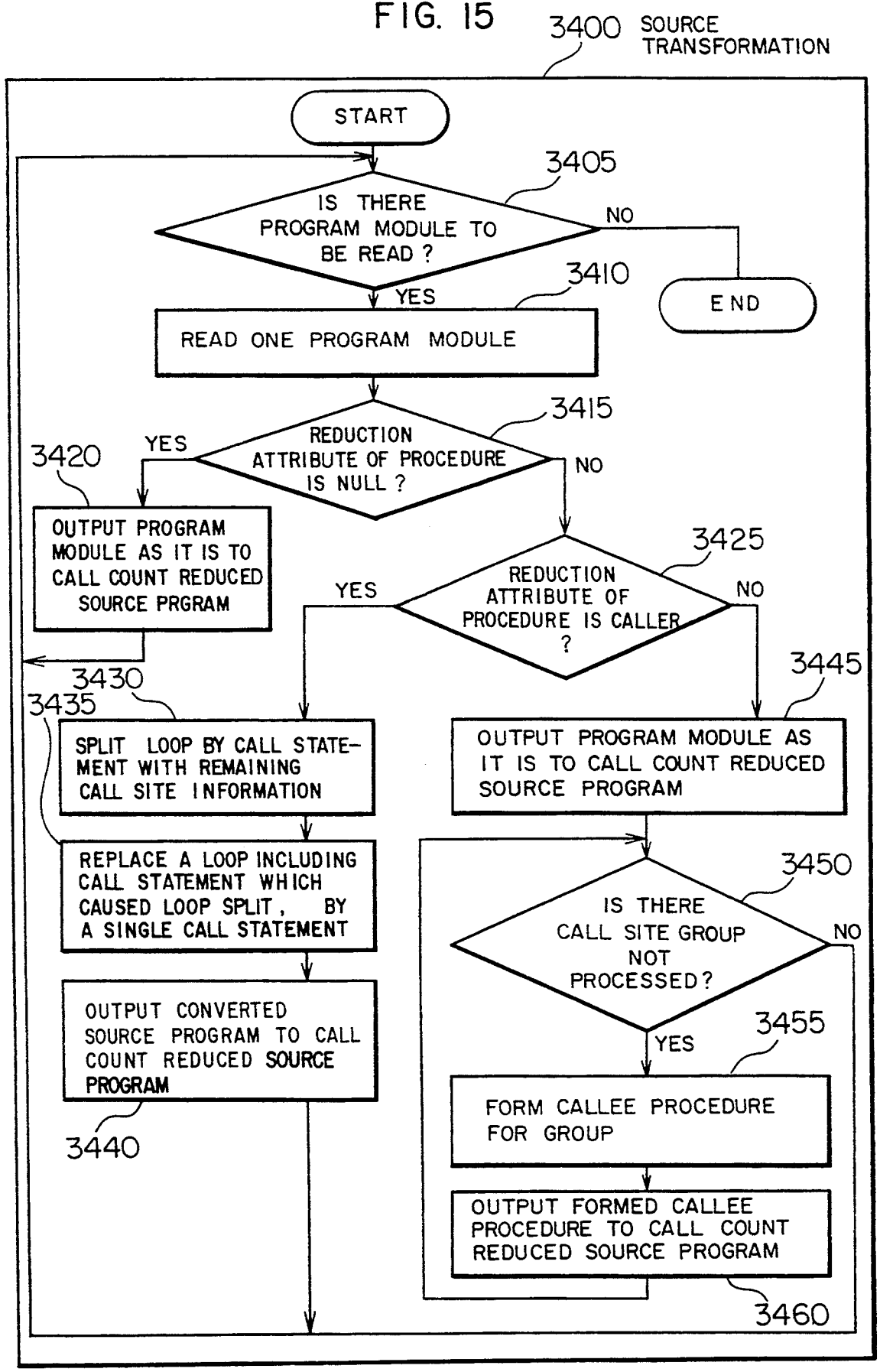
FIG. 15 is a flow chart illustrating source transformation.
Figure 17:
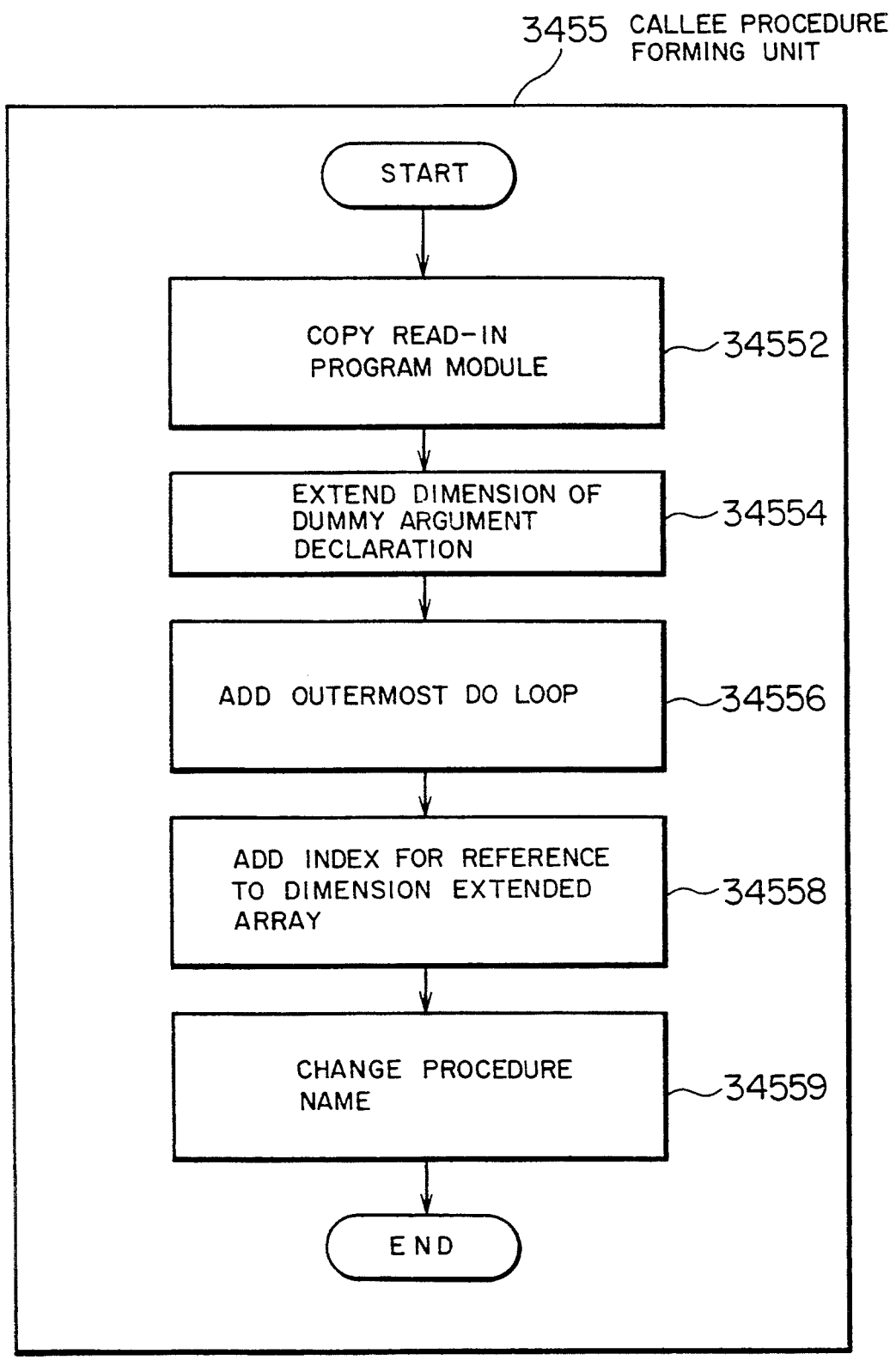
FIG. 17 is a flow chart showing the operation of forming a callee procedure.
Figure 21:
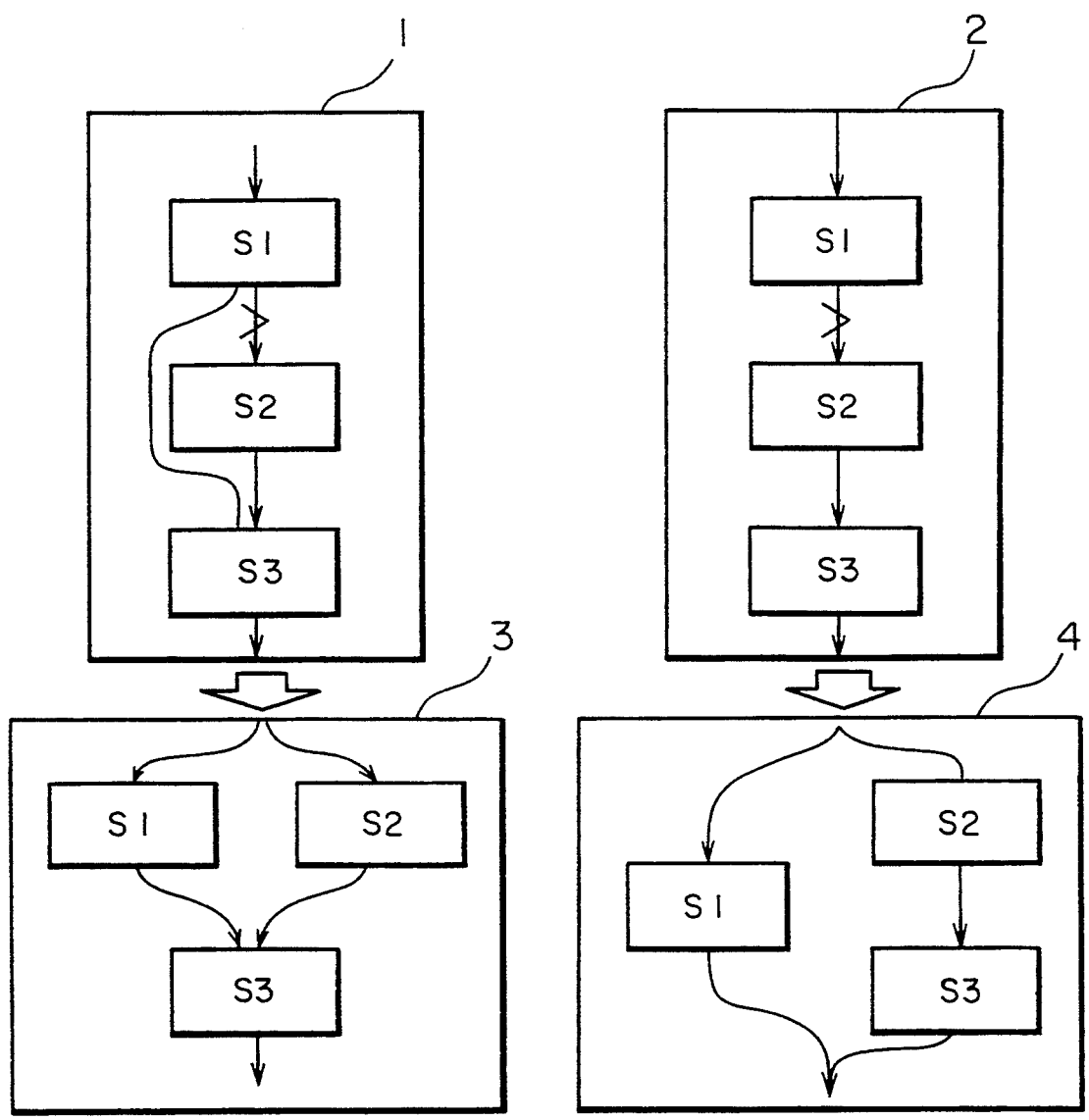
FIG. 21 shows dependence graphs to be used for explaining a prior art problem.

The description of FIG. 17 and of the operation at the source transformation step 3400 shown in FIG. 15 has thus been completed. The CALL count reduced source program 20 of the FORTRAN program shown in FIG. 2 which has undergone the source transformation step 3400 is shown in FIG. 3.

The CALL statements (at ISN 6 and ISN 7) within the loop between ISN 5 to ISN 10 of procedure WWQ shown in FIG. 2 are replaced by the CALL statements (at ISN 5 and ISN 8) outside of the loop interations as shown in FIG. 3, whereby the CALL count is reduced from 200 counts to 2 counts.

Next, how the vectorization and parallelization are carried out in the process by the object program generating unit 400 will be described with reference to FIGS. 18 to 19.

FIG. 18 shows the result of the vectorization of procedures WWQ and OPROD #1 of the CALL count reduced source program 20, in the form of source program.

Statements at ISN 6 and ISN 8 of procedure WWQ and statements from ISN 4 to ISN 7 of procedure OPROD #1 indicate the result of the vectorization process. An array with index * is a subarray of the associated array, the value of the index taking all values from the lower limit to the upper limit of the dimension. Substitution and arithmetic and logical operation is performed for each element of the subarray. VSUM represents a vector operation for calculating the sum of all elements of a subarray.

In contrast with the above, in the original source program 10 shown in FIG. 2, only the DO loop from ISN 5 to ISN 10 of procedure WWQ becomes an object of vectorization. However, this DO loop includes a procedure call so that it cannot be subjected to vectorization.

Statements at ISN 6 and ISN 8 of procedure WWQ and statements from ISN 4 to ISN 7 of procedure OPROD #1 shown in FIG. 18 correspond to statements at ISN 7 and ISN 9 of procedure WWQ and statements ISN 4 to ISN 7 of procedure OPROD shown in FIG. 2, respectively. For the latter statements, operations are repeated 100 times and 200 times, respectively. This is efficient loop length for vectorization, thus providing considerable speed-up through vectorization.

The operation of the CALL count reduction unit 300 thus promotes vectorization, thereby providing high speed processing of programs with supercomputers.

FIG. 19 shows the multiprocessor oriented parallelization result of procedure OPROD #1 of the CALL count reduced source program 20, in the form of source program.

Statements from ISN 6 to ISN 13 indicate the result of parallelization. Of the statements, ISN 7 to ISN 12 statements indicate that the operation thereof can be executed in parallel using NP processors. ISN 2 statement indicates that a number 8 is selected as NP, and ISN 5 statement indicates that I is a local variable for each processor.

Statements from ISN 6 to ISN 13 correspond to ISN 4 to ISN 7 statements of procedure OPROD shown in FIG. 2. For the latter statements, operations are iterated 200 times. In contrast, of statements from ISN 6 to ISN 12 shown in FIG. 19, operations for statements from ISN 7 to ISN 12 are iterated 200/NP times by NP processors. Although the total execution count, i.e., 200/NP*NP=NP, is the same as that by the original source program, the execution count at each processor becomes 1/NP. Since processors operate in parallel, the elapsed time is reduced by 1/NP.

The operation of the CALL count reduction unit 300 promotes parallelization, thus providing high speed processing of programs through multiprocessors.

The above-described embodiment provides the following advantages:

(1) Each procedure is processed only once in the interprocedural dataflow analysis so that analysis load can be reduced.

(2) Since the object of CALL count reduction is limited to the innermost loop, an increase of memory capacity due to copies of a callee procedure can be avoided while the execution count of CALLs is considerably reduced.

(3) Since a copy of a callee procedure is used in common, an increase of memory capacity can be avoided.

(4) Since CALLs within a copy of a callee procedure are deleted, there is no case that a copy of a caller procedure by the former copy is made. Thus, the number of procedure copies can be prevented from being increased exponentially.

(5) Since the CALL count information is used in determining a CALL count reduction site, CALL count reduction is performed with a priority of a CALL site having a better CALL count reduction effect.

While particular embodiments of the invention have been shown and described, it will be obvious to those skilled in the art that various changes and modifications may be made without departing from the present invention in its broader aspects.

What is claimed is:

1. A method of generating an object program from a source program which includes a plurality of procedures, at least one procedure of the procedures including at least one loop containing a procedure call for calling another procedure within the source program as a called procedure, and the object program being for executing the loop in parallel for different iterations of the loop, the method comprising the steps executed by a computer, the steps including:

detecting one or plural regions of a first kind, one or plural regions of a second kind and one or plural regions of a third kind, each of the one or plural regions of the first kind and each of the one or plural regions of the second kind for said each appearing array for said each iteration of the loop being regions respectively defined and used on one or more program execution paths, and each of the one or plural regions of the third kind being a region within the one or plural regions of the second kind which is used on one of the program execution paths for said each iteration without being defined on said one program execution path before being used;

determining whether or not each of one or more arrays appearing in a statement of the loop satisfies a first or second condition, the first condition being that any one of the one or plural regions of the first kind for the each appearing array for any iteration of the loop does not intersect with any one of the one or plural regions of the second kind for said each appearing array for any iteration of the loop, and the second condition being that any one of the one or plural regions of the first kind for the appearing array for any iteration of the loop does not intersect with any of the one or plural regions of the third kind for said each appearing array for another iteration of the loop following an iteration of the loop for which one of the one or plural regions of the first kind has been detected;

replacing, when any of the one or more appearing arrays is one of an array of a first kind which satisfies the first condition and an array of a second kind which does not satisfy the first condition but satisfies the second condition, each of the one or more arrays which is an array of the second kind by a new array; and compiling the source program after replacing the replaced each of the one or more arrays into an object program including codes for executing the loop in parallel.

* * * * *